US009692541B2

(12) United States Patent
Fujishiro et al.

(10) Patent No.: US 9,692,541 B2
(45) Date of Patent: Jun. 27, 2017

(54) MOBILE COMMUNICATION SYSTEM, COMMUNICATION CONTROL METHOD, BASE STATION, USER TERMINAL AND PROCESSOR FOR CANCELING INTERFERENCE

(71) Applicant: KYOCERA CORPORATION, Kyoto (JP)

(72) Inventors: Masato Fujishiro, Yokohama (JP); Chiharu Yamazaki, Ota-ku (JP)

(73) Assignee: KYOCERA Corporation, Kyoto (JP)

( * ) Notice: Subject to any disclaimer, the term of this patent is extended or adjusted under 35 U.S.C. 154(b) by 126 days.

(21) Appl. No.: 14/743,116

(22) Filed: Jun. 18, 2015

(65) Prior Publication Data
US 2015/0288474 A1 Oct. 8, 2015

Related U.S. Application Data

(63) Continuation of application No. PCT/JP2013/084094, filed on Dec. 19, 2013.
(Continued)

(51) Int. Cl.
H04B 7/00 (2006.01)
H04J 11/00 (2006.01)
H04W 72/08 (2009.01)
H04L 1/00 (2006.01)
H04L 5/00 (2006.01)

(52) U.S. Cl.
CPC ....... H04J 11/0053 (2013.01); H04J 11/0056 (2013.01); H04L 1/00 (2013.01);
(Continued)

(58) Field of Classification Search
CPC .. H04W 76/02; H04W 76/025; H04W 76/041
(Continued)

(56) References Cited

U.S. PATENT DOCUMENTS 8,135,349 B2 * 3/2012 Hwang ................ H04B 7/0452
375/267
8,260,207 B2 * 9/2012 Srinivasan ............ H04W 16/08
370/330
(Continued)

OTHER PUBLICATIONS

International Search Report; PCT/JP2013/084094; Mar. 25, 2014.
3GPP TR 36.819 V11.10 (Dec. 2011); 3rd Generation Partnership Project; Technical Specification Group Radio Access Network; Coordinated multi-point operation for LTE physical layer aspects (Release 11).
Written Opinion; PCT/JP2013/084094; Mar. 25, 2014.

Primary Examiner — Dmitry H Levitan
(74) Attorney, Agent, or Firm — Studebaker & Brackett PC

(57) ABSTRACT

A mobile communication system comprises: a user terminal configured to receive a desired wave signal being a signal from a serving cell to the user terminal and an interference wave signal being a signal to another user terminal; and a base station configured to manage the serving cell. The base station includes a base station-side control unit configured to superpose an interference replica signal corresponding to the interference wave signal on the desired wave signal so as to cancel the interference wave signal received by the user terminal. The base station-side control unit is configured to transmit a predetermined signal corresponding to a first reference signal included in the interference wave signal. The user terminal includes a terminal-side control unit configured to derive first received power under a situation where the interference replica signal is superposed on the desired wave signal on the basis of at least one of the first reference signal and the predetermined signal.

16 Claims, 20 Drawing Sheets

Related U.S. Application Data

(60) Provisional application No. 61/740,989, filed on Dec. 21, 2012, provisional application No. 61/745,016, filed on Dec. 21, 2012, provisional application No. 61/745,043, filed on Dec. 21, 2012, provisional application No. 61/748,287, filed on Jan. 2, 2013.

(52) U.S. Cl.
CPC ........... *H04W 72/085* (2013.01); *H04L 5/005* (2013.01); *H04L 5/0023* (2013.01); *H04L 5/0035* (2013.01); *H04L 5/0073* (2013.01)

(58) Field of Classification Search
USPC .................. 370/310, 328, 329, 349, 465
See application file for complete search history.

(56) References Cited

U.S. PATENT DOCUMENTS

| | | | |
|---|---|---|---|
| 8,750,887 B2 * | 6/2014 | Chandrasekhar | H04L 5/0096 370/252 |
| 8,761,088 B2 * | 6/2014 | Matsumoto | H04J 11/004 370/328 |
| 9,426,813 B2 * | 8/2016 | Jung | H04J 11/005 |
| 2014/0341057 A1 * | 11/2014 | Seo | H04W 24/10 370/252 |
| 2015/0195057 A1 * | 7/2015 | Tan | H04J 11/005 370/252 |
| 2015/0358099 A1 * | 12/2015 | Fujishiro | H04J 11/004 370/329 |

* cited by examiner ( PRIOR ART )

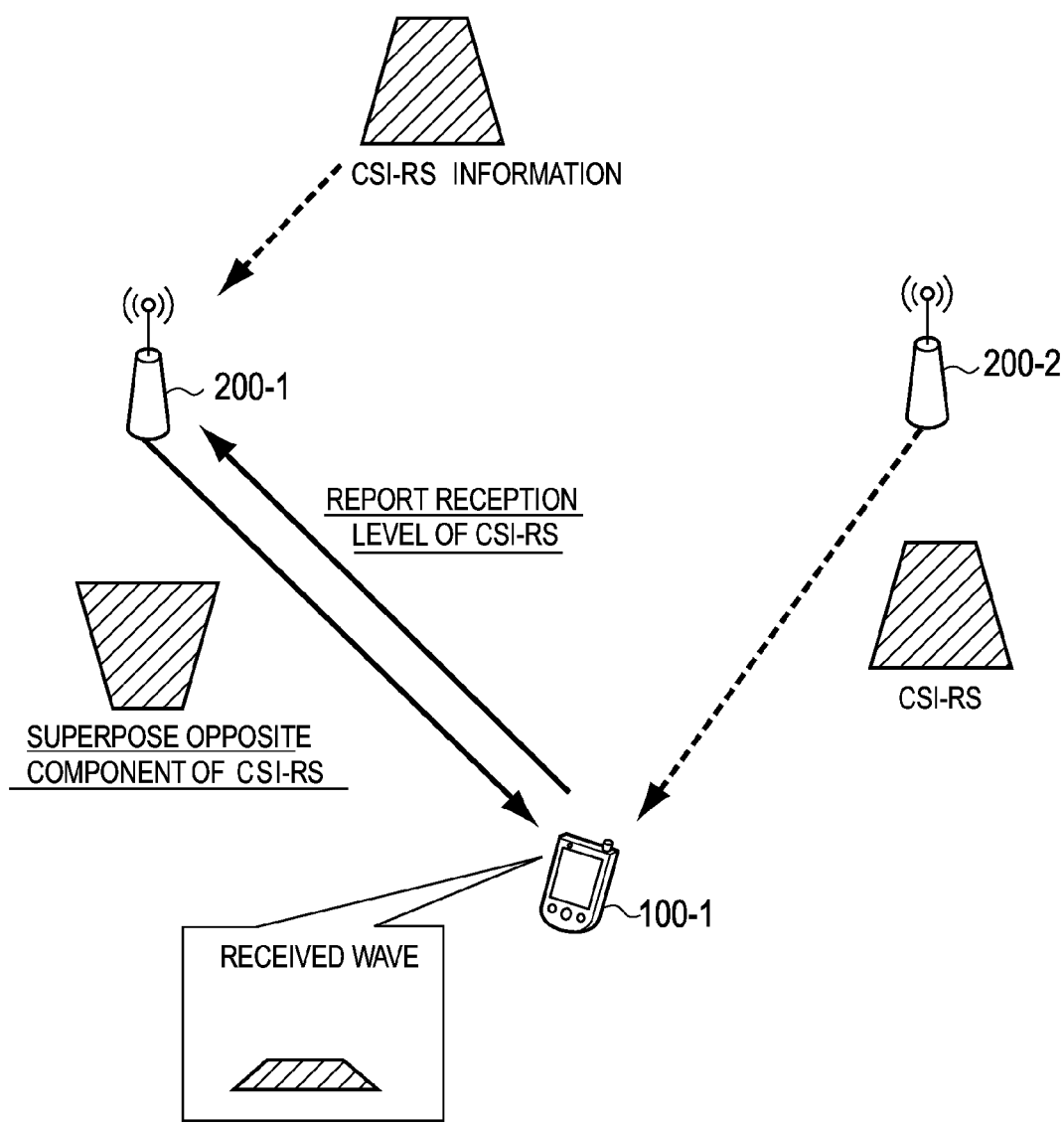

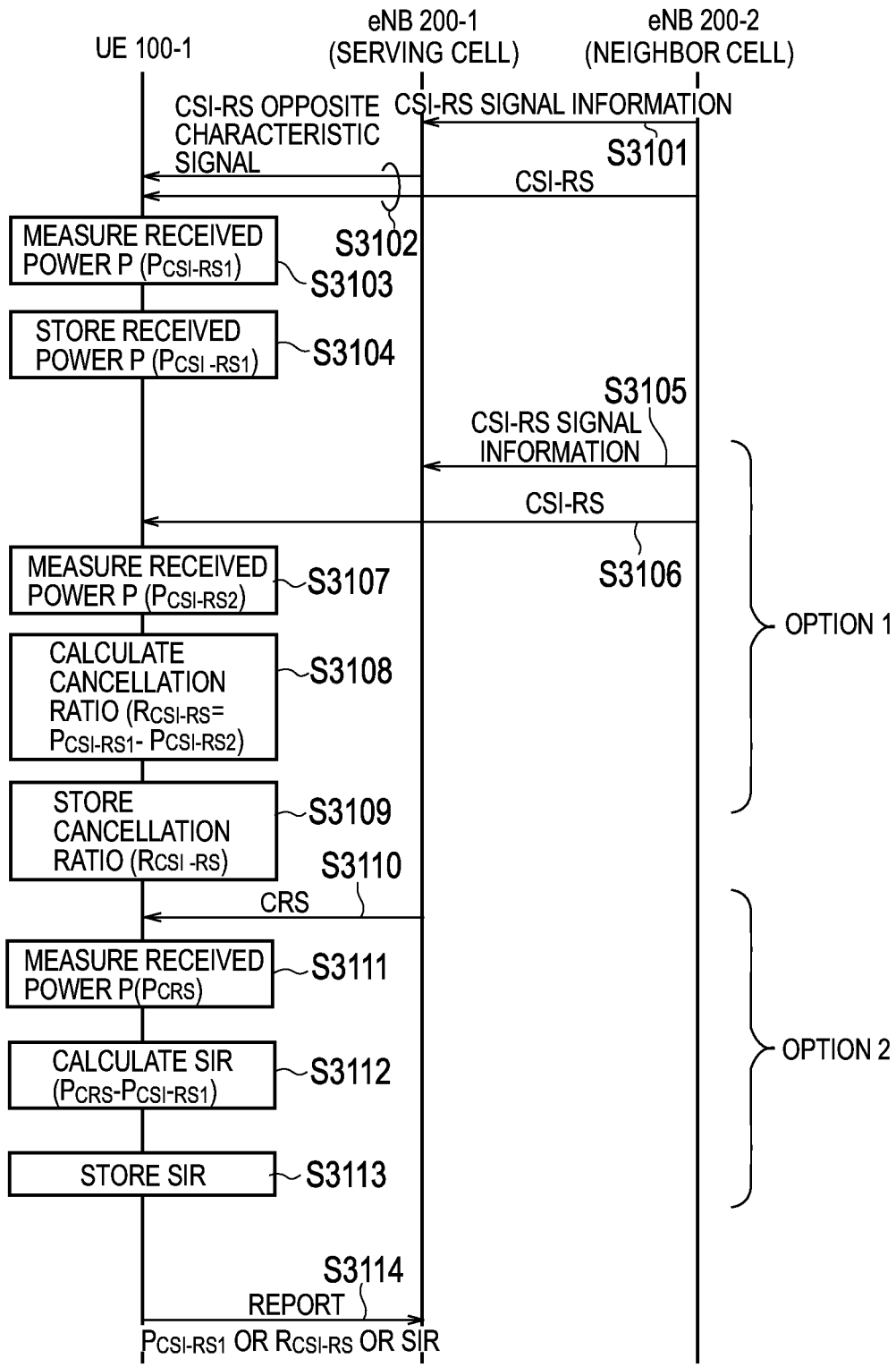

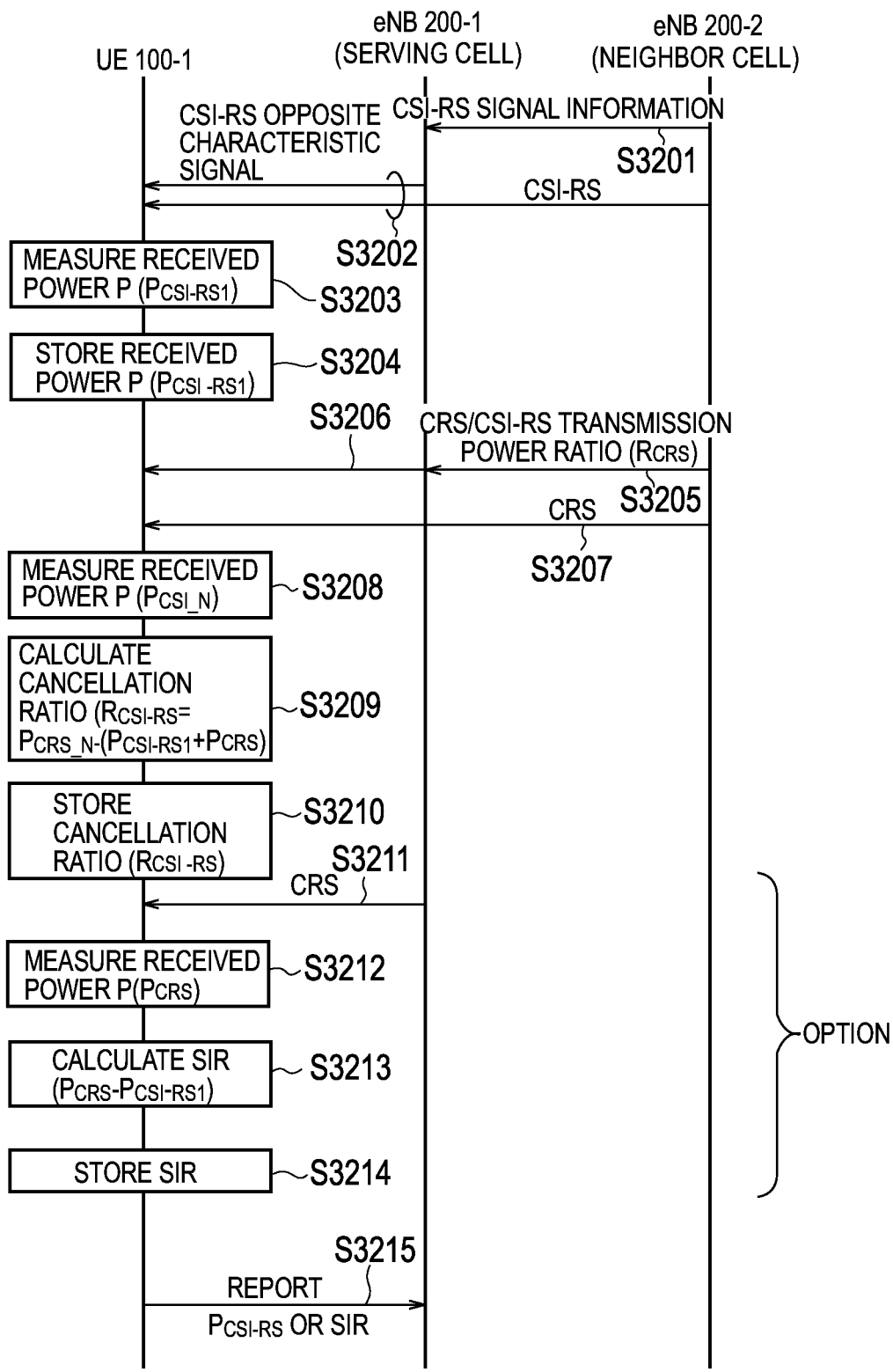

MOBILE COMMUNICATION SYSTEM, COMMUNICATION CONTROL METHOD, BASE STATION, USER TERMINAL AND PROCESSOR FOR CANCELING INTERFERENCE

TECHNICAL FIELD

The present disclosure relates to a mobile communication system that supports CoMP, a communication control method therefor, a base station thereof, a user terminal thereof, and a processor thereof.

BACKGROUND ART

In 3GPP (3rd Generation Partnership Project) that is a project aiming to standardize a mobile communication system, after release 11, the standardization of CoMP (Coordinated Multi-Point) is scheduled to be performed (see non patent document 1). The CoMP represents a communication mode in which a transmission/reception point (a base station or a cell) in the same place is positioned as one "point" and a plurality of points communicate with a user terminal in coordination with one another.

As a downlink CoMP scheme, JT (Joint Transmission), DPS (Dynamic Point Selection), CS (Coordinated Scheduling), and CB (Coordinated Beamforming) are proposed.

The JT-CoMP represents a scheme in which a plurality of points simultaneously perform transmission to a user terminal by using the same radio resource. The DPS-CoMP and the CS-CoMP represent a scheme in which a plurality of points ensure the same radio resource and selectively perform transmission to a user terminal. The CB-CoMP represents a scheme in which a plurality of points perform beamforming and null steering of a transmission beam in coordination with one another.

PRIOR ART DOCUMENT

Non-Patent Document

Non Patent Document 1: 3GPP Technical Report "TR 36.819 V11.1.0" December 2011

SUMMARY OF THE DISCLOSURE

However, each of the aforementioned CoMP schemes has the following problems.

The JT-CoMP, the DPS-CoMP, and the CS-CoMP have a problem that the use efficiency of a radio resource is reduced because each point consumes a radio resource for one user terminal.

The CB-CoMP has a problem that although it is possible to suppress the reduction of the use efficiency of a radio resource, the cost (a device cost and an installation cost) of each point is high because each point needs to have a plurality of antennas.

A scheme (a coordinated interference cancellation scheme) in which a base station managing a serving cell of a user terminal transmits an interference replica signal corresponding to an interference wave signal by superposing the interference replica signal on a desired wave signal so as to cancel the interference wave signal received by the user terminal, is discussed for resolving these problems.

Further, it is desirable that the degree at which the interference replica signal cancels the interference wave signal, that is, an effect of interference cancellation, can be evaluated in the coordinated interference cancellation scheme.

Therefore, the present disclosure provides a mobile communication system in which an effect of interference cancellation can be evaluated in a coordinated interference cancellation scheme, a communication control method therefor, a base station thereof, a user terminal thereof, and a processor thereof.

A mobile communication system according to an embodiment comprises: a user terminal configured to receive a desired wave signal being a signal from a serving cell to the user terminal and an interference wave signal being a signal to another user terminal; and a base station configured to manage the serving cell. The base station includes a base station-side control unit configured to superpose an interference replica signal corresponding to the interference wave signal on the desired wave signal so as to cancel the interference wave signal received by the user terminal. The base station-side control unit is configured to transmit a predetermined signal corresponding to a first reference signal included in the interference wave signal. The user terminal includes a terminal-side control unit configured to derive first received power under a situation where the interference replica signal is superposed on the desired wave signal on the basis of at least one of the first reference signal and the predetermined signal.

BRIEF DESCRIPTION OF THE DRAWINGS

FIG. 20 is a diagram for explaining an operation according to the second embodiment.

FIG. 21 is a sequence diagram of an operation pattern 1 according to the second embodiment.

FIG. 22 is a sequence diagram of an operation pattern 2 according to the second embodiment.

DESCRIPTION OF THE EMBODIMENT

Overview of Embodiment

Figure 1:
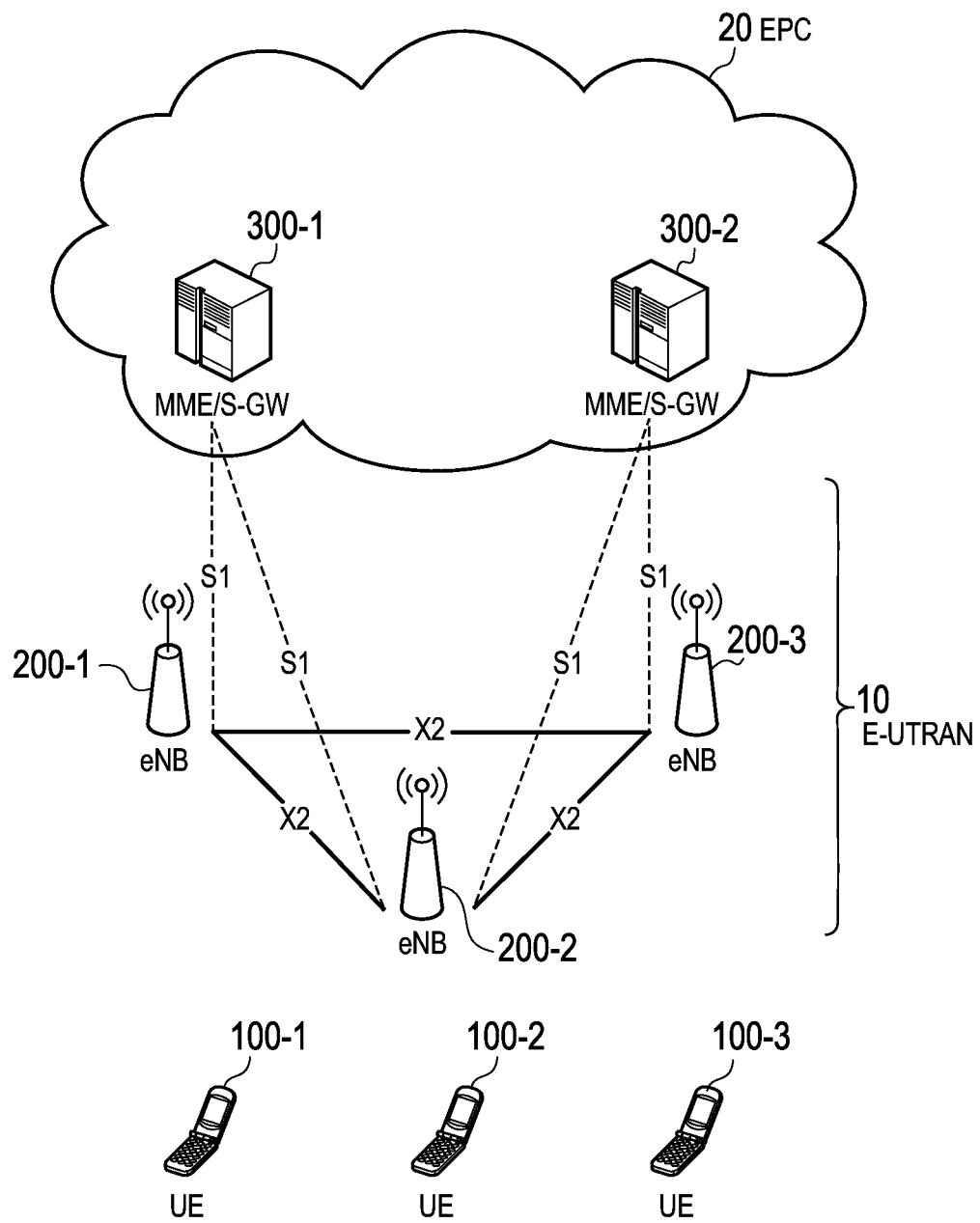
FIG. 1 is a configuration diagram of an LTE system according to a first embodiment and a second embodiment.

A mobile communication system according to an embodiment comprises: a user terminal configured to receive a desired wave signal being a signal from a serving cell to the user terminal and an interference wave signal being a signal to another user terminal; and a base station configured to manage the serving cell. The base station includes a base station-side control unit configured to superpose an interference replica signal corresponding to the interference wave signal on the desired wave signal so as to cancel the interference wave signal received by the user terminal. The base station-side control unit is configured to transmit a predetermined signal corresponding to a first reference signal included in the interference wave signal. The user terminal includes a terminal-side control unit configured to derive first received power under a situation where the interference replica signal is superposed on the desired wave signal on the basis of at least one of the first reference signal and the predetermined signal.

In the embodiment, the other user terminal is connected to a neighbor cell adjacent to the serving cell, and the interference wave signal is a signal form the neighbor cell.

In the embodiment, the base station manages the serving cell to which the user terminal is connected and a neighbor cell to which the other user terminal is connected and which is adjacent to the serving cell, and the base station-side control unit transmits the interference wave signal to the other user terminal.

In the embodiment, the other user terminal is located in the serving cell to which the user terminal is connected, and the base station-side control unit transmits the interference wave signal to the other user terminal.

In the embodiment, the base station manages each of communication with the user terminal and communication with the other user terminal, and the base station-side control unit transmits the interference wave signal to the other user terminal.

In the embodiment, the predetermined signal is a reference signal replica for canceling the first reference signal included in the interference wave signal. The base station-side control unit transmits the reference signal replica in the interference replica signal. The terminal-side control unit measures received power of the first reference signal under a situation where the interference replica signal is superposed on the desired wave signal. The first received power is the received power of the first reference signal.

In the embodiment, the terminal-side control unit notifies the base station of the first received power.

In the embodiment, the user terminal receives a second reference signal from the serving cell in addition to the desired wave signal. The terminal-side control unit further measures second received power that is received power of the second reference signal. The terminal-side control unit notifies the base station of a desired wave-to-interference wave ratio that indicates a ratio of the first received power and the second received power.

In the embodiment, the terminal-side control unit further measures third received power that is received power of the first reference signal under a situation where the interference replica signal is not superposed on the desired wave signal. The terminal-side control unit notifies the base station of an interference cancellation ratio that indicates a ratio of the first received power and the third received power.

In the embodiment, the user terminal receives a third reference signal from a neighbor cell adjacent to the serving cell in addition to the interference wave signal, and information indicating a transmission power ratio of transmission power of the first reference signal and transmission power of the third reference signal. The terminal-side control unit measures fourth received power that is received power of the third reference signal. The terminal-side control unit notifies the base station of an interference cancellation ratio that indicates a ratio of the first received power and the fourth received power on the basis of the first received power, the fourth received power, and the transmission power ratio.

In the embodiment, the predetermined signal is a signal having a signal sequence different from that of the first reference signal, and is an evaluation reference signal to which the same transmission process as that of the interference replica signal is applied. The terminal-side control unit performs first channel estimation using the evaluation reference signal and second channel estimation using the first reference signal. The terminal-side control unit estimates received power of a synthesized signal of the first reference signal and the evaluation reference signal on the basis of a result of the first channel estimation and a result of the second channel estimation when it is assumed that the evaluation reference signal is the same signal sequence as that of the first reference signal. The first received power is the estimated received power.

A communication control method according to the embodiment controls a user terminal configured to receive a desired wave signal being a signal from a serving cell to the user terminal and an interference wave signal being a signal to another user terminal and a base station configured to manage the serving cell. The communication control method comprises the steps of: by the base station, superposing an interference replica signal corresponding to the interference wave signal on the desired wave signal so as to cancel the interference wave signal received by the user terminal; by the base station, transmitting a predetermined signal corresponding to a first reference signal included in the interference wave signal; and by the user terminal, deriving first received power under a situation where the interference replica signal is superposed on the desired wave signal.

A base station according to the embodiment comprises: a control unit configured to superpose an interference replica signal corresponding to an interference wave signal being a signal to a second user terminal on the desired wave signal being a signal to a first user terminal so as to cancel the interference wave signal received by the first user terminal. The control unit transmits a predetermined signal corresponding to a first reference signal included in the interference wave signal.

A user terminal according to the embodiment comprises: a reception unit configured to receive, from the serving cell, a predetermined signal corresponding to a first reference signal included in an interference wave signal being a signal to another terminal; and a control unit configured to measure first received power under a situation where an interference replica signal corresponding to the interference wave signal is superposed on a desired wave signal being a signal to the user terminal on the basis of at least one of the first reference signal and the predetermined signal.

A processor according to the embodiment for controlling a base station executes: a process of superposing an interference replica signal corresponding to an interference wave signal being a signal to a second user terminal on a desired wave signal being a signal to a first user terminal so as to cancel the interference wave signal received by the first user terminal; and a process of transmitting a predetermined signal corresponding to a first reference signal included in the interference wave signal.

A processor according to the embodiment is provided in a user terminal that receives a desired wave signal from a serving cell and an interference wave signal being a signal to another user terminal. The processor executes: a process of receiving, from the serving cell, a predetermined signal corresponding to a first reference signal included in an interference wave signal being a signal to another user terminal; and a process of measuring received power under a situation where an interference replica signal corresponding to the interference wave signal is superposed on a desired wave signal being a signal to the user terminal on the basis of at least one of the first reference signal and the predetermined signal.

First Embodiment

Hereinafter, with reference to the accompanying drawings, a description will be provided for an embodiment when the present disclosure is applied to a mobile communication system (an LTE system) configured in accordance with 3GPP standards.

(LTE System)

FIG. 1 is a configuration diagram of an LTE system according to the present embodiment.

As illustrated in FIG. 1, the LTE system includes a plurality of UEs (User Equipments) 100, E-UTRAN (Evolved Universal Terrestrial Radio Access Network) 10, and EPC (Evolved Packet Core) 20. The EPC 20 corresponds to a core network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 manages one or a plurality of cells and performs radio communication with the UE 100 with which a connection with the cell of the eNB 200 is established.

It is noted that the "cell" is used as a term indicating a minimum unit of a radio communication area, and is also used as a term indicating a function of performing radio communication with the UE 100.

The eNB 200 has a radio resource management (RRM) function, a routing function of user data, and a measurement control function for mobility control and scheduling.

The EPC 20 includes a plurality of MME (Mobility Management Entity)/S-GWs (Serving-Gateways) 300.

The MME is a network node for performing various mobility controls, for example, for the UE 100 and corresponds to a controller. The S-GW is a network node that performs transfer control of user data and corresponds to a mobile switching center. The EPC 20 including the MME/S-GW 300 accommodates the eNB 200.

The eNBs 200 are connected mutually via an X2 interface. Furthermore, the eNB 200 is connected to the MME/S-GW 300 via an S1 interface.

Next, the configurations of the UE 100 and the eNB 200 will be described.

Figure 2:
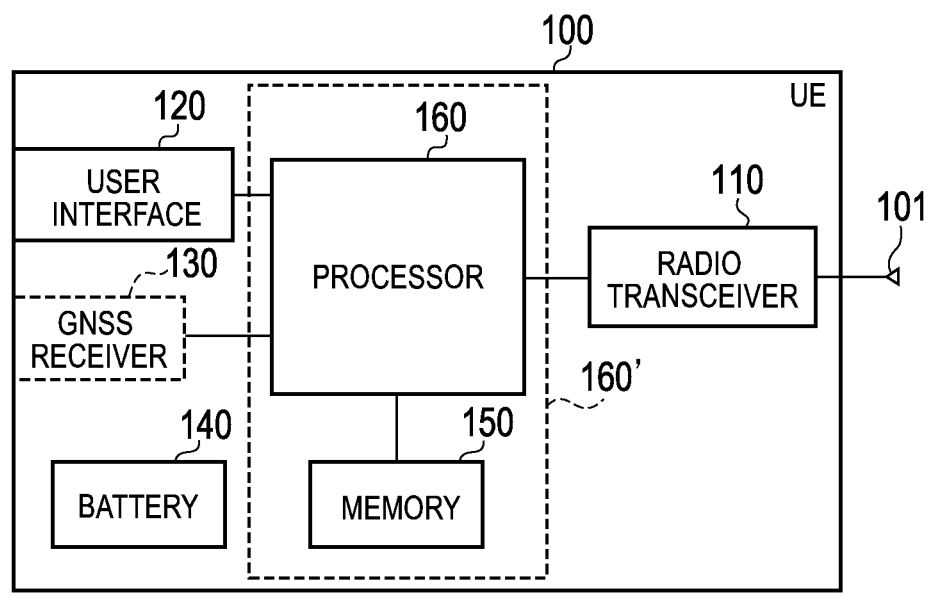
FIG. 2 is a block diagram of UE according to the first embodiment and the second embodiment.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a control unit.

The UE 100 may not have the GNSS receiver 130. Furthermore, the memory 150 may be integrally formed with the processor 160, and this set (that is, a chipset) may be called a processor 160'.

The antenna 101 and the radio transceiver 110 are used to transmit and receive a radio signal. A plurality of antennas 101 may be provided. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and for example, includes a display, a microphone, a speaker, various buttons and the like. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like of a baseband signal, and a CPU (Central Processing Unit) that performs various processes by executing the program stored in the memory 150. The processor 160 may further include a codec that performs encoding and decoding of sound and video signals. The processor 160 implements various processes and various communication protocols described later.

Figure 3:
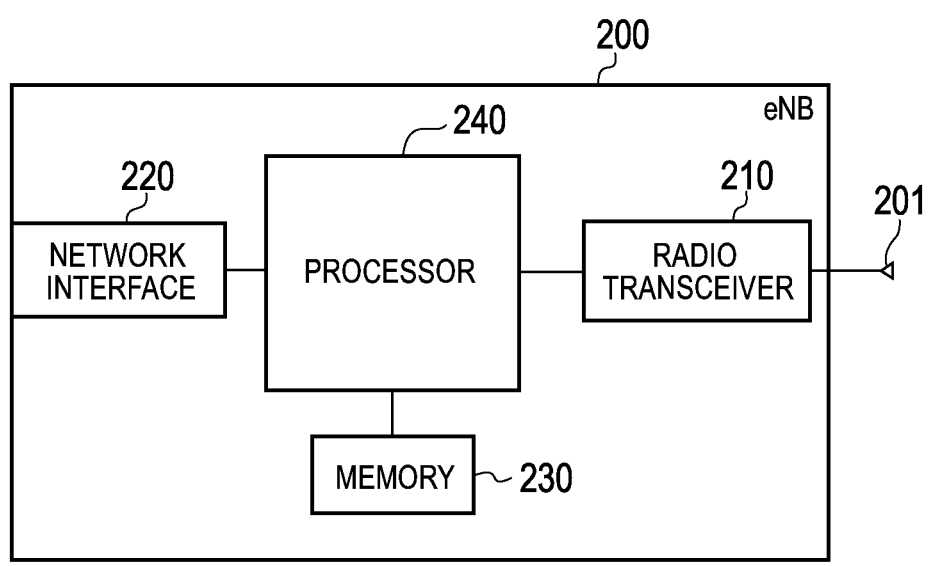
FIG. 3 is a block diagram of eNB according to the first embodiment and the second embodiment.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a control unit. Further, the memory 230 may be integrally formed with the processor 240, and this set (that is, a chipset) may be called a processor.

The antenna 201 and the radio transceiver 210 are used to transmit and receive a radio signal. A plurality of antennas 201 may be provided. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighbor eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes a baseband processor that performs modulation and demodulation, encoding and decoding and the like of a baseband signal, and a CPU that performs various processes by executing the program stored in the memory 230. The processor 240 implements various processes and various communication protocols described later.

Figure 4:
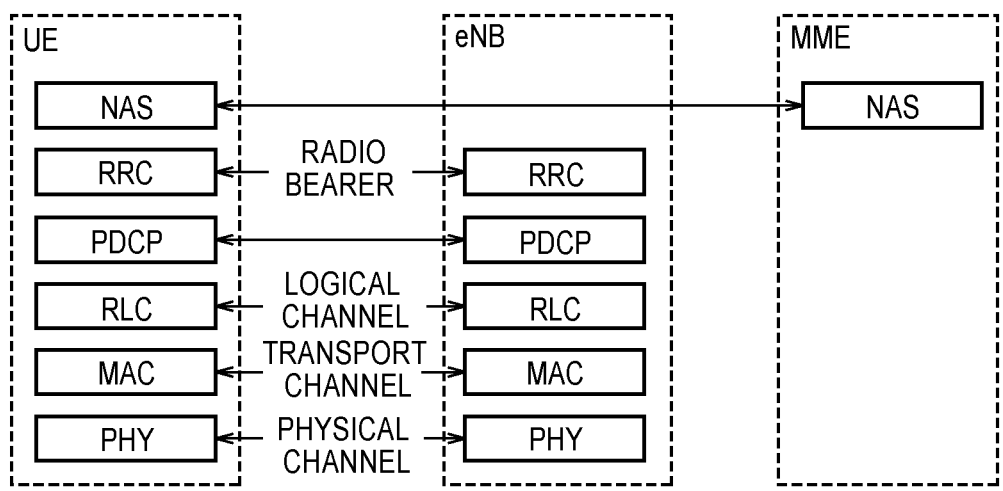
FIG. 4 is a protocol stack diagram of a radio interface in an LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, resource mapping and demapping, and the like. Between the PHY layer of the UE 100 and the PHY layer of the eNB 200, data is transmitted via the physical channel.

The MAC layer performs preferential control of data, and a retransmission process and the like by hybrid ARQ (HARQ). Between the MAC layer of the UE 100 and the MAC layer of the eNB 200, data is transmitted via a transport channel. The MAC layer of the eNB 200 includes a scheduler for determining a transport format (a transport block size, a modulation and coding scheme, and the like) of an uplink and a downlink, and an assignment resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in a connected state (an RRC connected state), and when there is no RRC connection, the UE 100 is in an idle state (an RRC idle state).

A NAS (Non-Access Stratum) layer positioned above the RRC layer performs session management, mobility management and the like.

Figure 5:
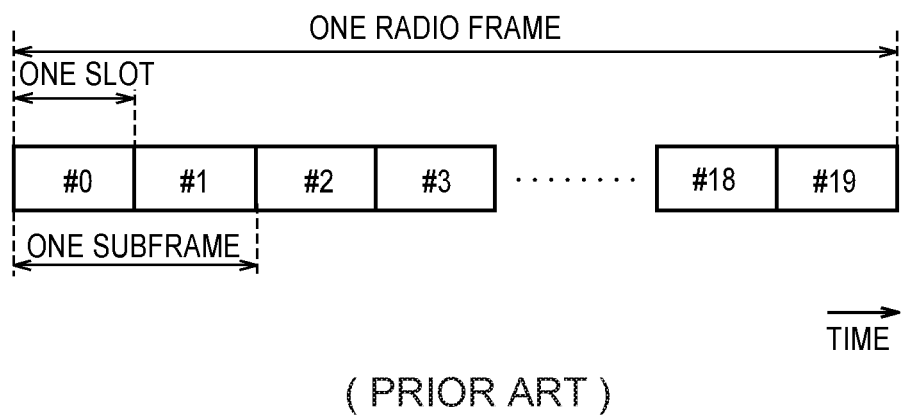
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP). The resource block includes a plurality of subcarriers in the frequency direction. A minimum resource unit configured by one subcarrier and one symbol is called a resource element (RE).

Furthermore, among radio resources assigned to the UE 100, a frequency resource can be designated by a resource block and a time resource can be designated by a subframe (or a slot).

In the uplink, both ends, in the frequency direction, of each subframe are control regions mainly used as a physical uplink control channel (PUCCH). Furthermore, the center portion, in the frequency direction, of each subframe is a region that can be mainly used as a physical uplink shared channel (PUSCH). Moreover, in each subframe, a sounding reference signal (SRS) is arranged.

Figure 6:
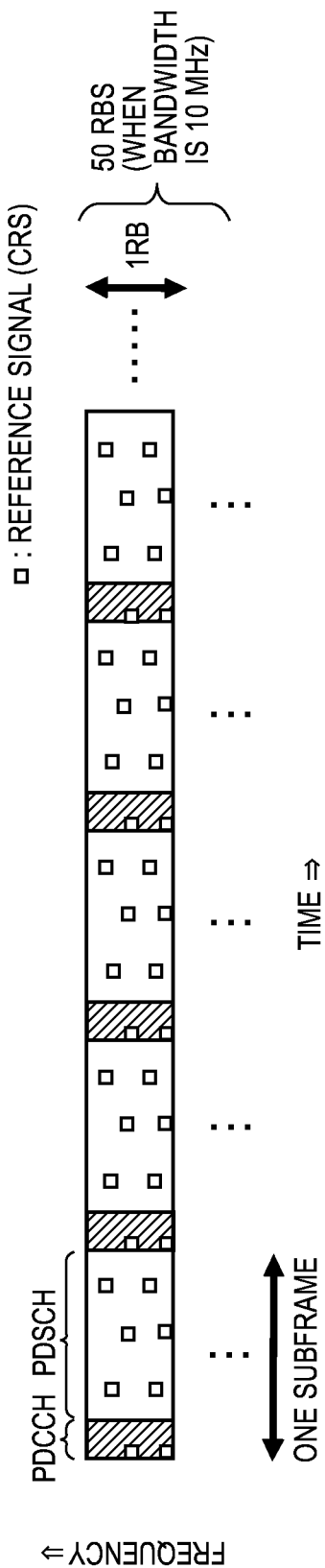
FIG. 6 is a configuration diagram of a radio frame used in a downlink.

FIG. 6 is a configuration diagram of a radio frame used in a downlink.

As illustrated in FIG. 6, in the downlink, an interval of several symbols at the head of each subframe is a control region mainly used as a physical downlink control channel (PDCCH). Furthermore, the remaining interval of each subframe is a region that can be mainly used as a physical downlink shared channel (PDSCH).

In a downlink, a cell-specific reference signal (CRS) and/or a downlink reference signal such as a channel-state-information reference signal (CSI-RS) are dispersed and arranged in each subframe. The downlink reference signal is configured by a predetermined orthogonal signal sequence, and arranged in a predetermined resource element.

(Overview of Coordinated Interference Cancellation Scheme)

Figure 7:
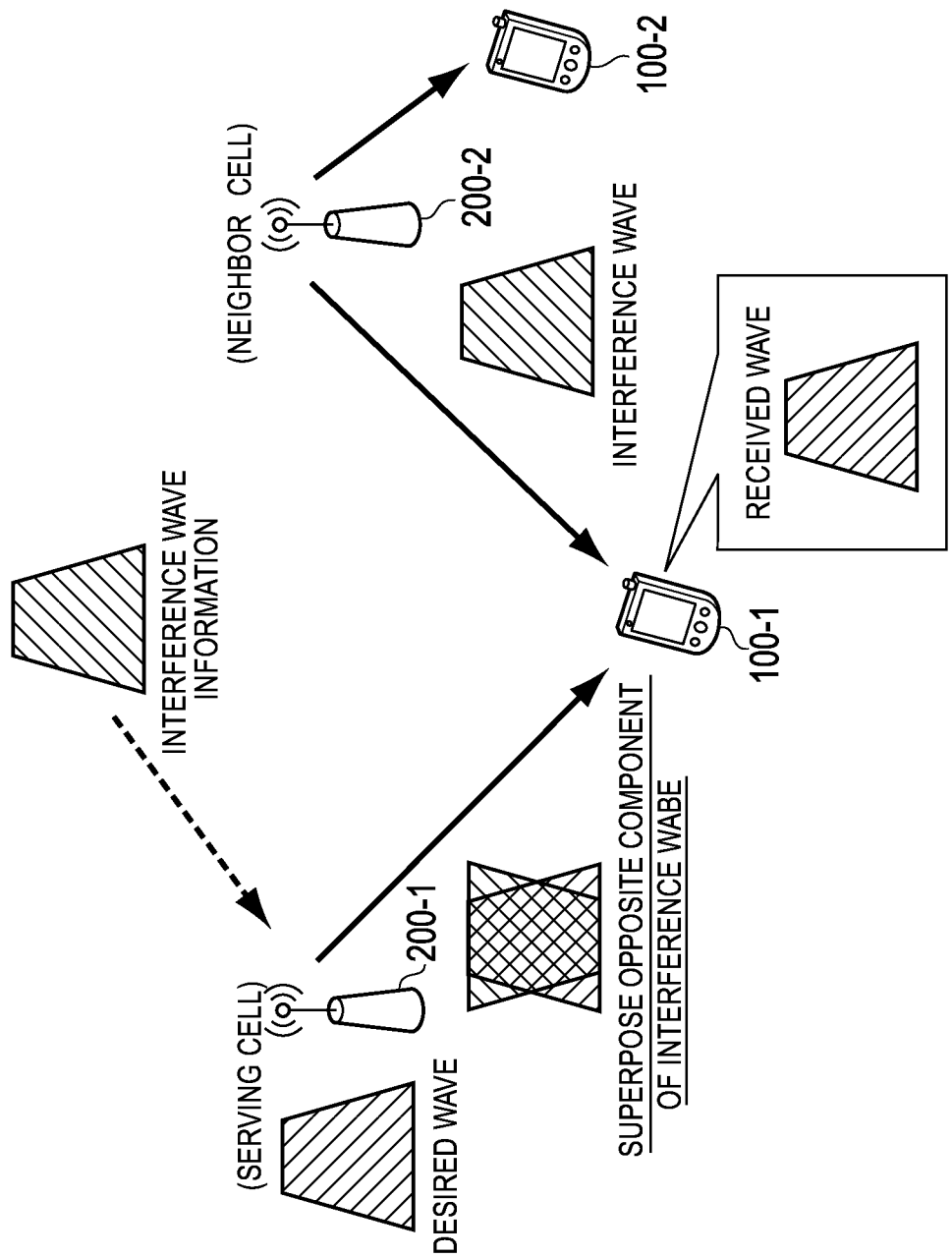
FIG. 7 is a diagram for explaining the overview of a coordinated interference cancellation scheme according to the first embodiment and the second embodiment.

FIG. 7 is a diagram for explaining the overview of the coordinated interference cancellation scheme according to the present embodiment.

As illustrated in FIG. 7, UE 100-1 is UE to which the coordinated interference cancellation scheme is applied. The UE 100-1 establishes a connection (an RRC connection) with a cell managed by eNB 200-1. That is, the cell managed by the eNB 200-1 corresponds to a serving cell of the UE 100-1.

In the present embodiment, a neighbor cell adjacent to the serving cell is managed by eNB 200-2 different from the eNB 200-1. In the example of FIG. 7, UE 100-2 establishes a connection (an RRC connection) with a cell managed by the eNB 200-2. In addition, the eNB 200-1 and the eNB 200-2 synchronize with each other.

The eNB 200-1 and the eNB 200-2 are connected mutually via an X2 interface. Furthermore, the eNB 200-1 and the eNB 200-2 are connected to the MME/S-GW 300 via the S1 interface.

The UE 100-1 is located around the boundary between the cell (the serving cell) managed by the eNB 200-1 and the cell (the neighbor cell) managed by the eNB 200-2. Thus, when the eNB 200-2 performs transmission to the UE 100-2 by using a radio resource equal to that used in the eNB 200-1, the UE 100-1 receives downlink interference from the eNB 200-2. That is, the UE 100-1 receives a desired wave signal from the serving cell and also receives an interference wave signal from the neighbor cell.

In such an operation environment, the eNB 200-1 generates an interference replica signal corresponding to the interference wave signal and superposes the interference replica signal on the desired wave signal. Then, the eNB 200-1 transmits the desired wave signal superposed with the interference replica signal to the UE 100-1.

Furthermore, the eNB 200-1 generates the interference replica signal such that the interference replica signal received in the UE 100-1 cancels the interference wave signal received in the UE 100-1. Specifically, the eNB 200-1 generates the interference replica signal such that a phase of the interference replica signal received in the UE 100-1 is opposite to a phase of the interference wave signal received in the UE 100-1. Furthermore, the eNB 200-1 generates the interference replica signal such that an amplitude of the interference replica signal received in the UE 100-1 is equal to an amplitude of the interference wave signal received in the UE 100-1.

In this way, the interference replica signal is synthesized with the interference wave signal in an opposite phase in the location of the UE 100-1, and cancels the interference wave signal. Accordingly, it is possible to reduce received power of the interference wave signal in the UE 100-1, resulting in the improvement of SIR. Furthermore, since it is not necessary to ensure a radio resource for the UE 100-1 in the neighbor cell, it is possible to improve the use efficiency of a radio resource as compared with JT-CoMP, DPS-CoMP, and CS-CoMP. Moreover, when the eNB 200-2 does not have a plurality of antennas, that is, even when beamforming and null steering are not possible, the present scheme (the coordinated interference cancellation scheme) is applicable.

Furthermore, the interference replica signal remains without being synthesized with the interference wave signal in an opposite phase in a location other than the location of the UE 100-1. Accordingly, the interference replica signal also acts as a disturbing signal, which disturbs the demodulation of the desired wave signal, in the location other than the location of the UE 100-1. Consequently, according to the coordinated interference cancellation scheme, it is also possible to enhance the confidentiality of communication.

The eNB 200-1 acquires at least a part of information, which is necessary for generating the interference replica signal, from at least one of the eNB 200-2, the MME/S-GW 300, and the UE 100-1.

In order to generate the interference replica signal, firstly, information (interference wave information) on a signal waveform of the interference wave signal transmitted by the eNB 200-2 is necessary.

However, the interference wave signal transmitted by the eNB 200-2 receives the influence of a channel characteristic between the eNB 200-2 and the UE 100-1, and is received in the UE 100-1. Accordingly, in order to generate the interference replica signal, secondly, information (channel information) on the channel characteristic between the eNB 200-2 and the UE 100-1 is necessary.

Moreover, in order to improve the accuracy of the interference replica signal, information other than interference wave information and the channel information is also available. Details of such information will be described later.

(Configuration of eNB 200-1)

Figure 8:
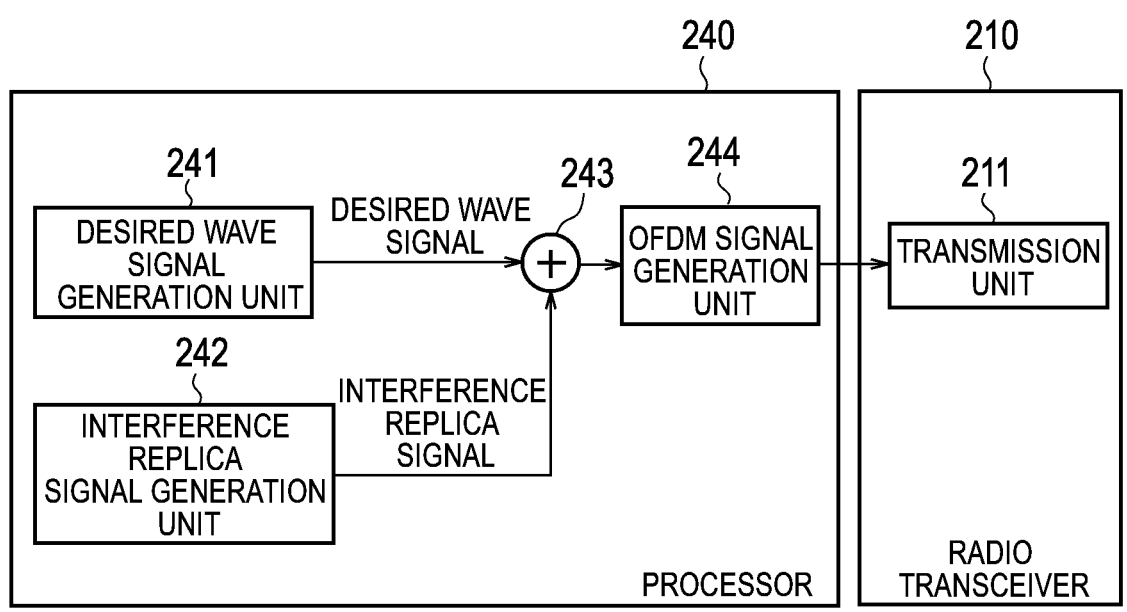
FIG. 8 is a block diagram of eNB for realizing the coordinated interference cancellation scheme according to the first embodiment and the second embodiment.

FIG. 8 is a block diagram of the eNB 200-1 for realizing the coordinated interference cancellation scheme.

As illustrated in FIG. 8, the processor 240 includes a desired wave signal generation unit 241 that generates the desired wave signal, an interference replica signal generation unit 242 that generates the interference replica signal, a superposition unit 243 that superposes the interference replica signal on the desired wave signal, and an OFDM signal generation unit 244 that generates an OFDM signal (a superposed signal) from the desired wave signal superposed with the interference replica signal. The radio transceiver 210 includes a transmission unit 211 that amplifies and transmits the OFDM signal (the superposed signal).

The desired wave signal generation unit 241 performs transmission processing on transmission data (user data) to the UE 100-1, thereby converting the transmission data to the UE 100-1 into the desired wave signal. The transmission processing includes a coding process, a modulation process, a precoding process, and a resource mapping process.

The coding process is a process for coding the transmission data. The coding process may include a process for adding an error detecting code (a CRC code) to the transmission data, a scrambling process and the like.

The modulation process is a process for modulating the coded transmission data (the coded data).

The precoding process is a process for precoding the coded data (a desired wave signal waveform) modulated on the basis of channel information indicating a channel characteristic between the eNB 200-1 and the UE 100-1.

In addition, hereinafter, the channel information indicating the channel characteristic between the eNB 200-1 and the UE 100-1 is called "channel information 1" and the channel information indicating the channel characteristic between the eNB 200-2 and the UE 100-1 is called "channel information 2".

The resource mapping process is a process for mapping the precoded desired wave signal waveform to a physical resource.

As a result of these processes, the desired wave signal generation unit 241 outputs the desired wave signal to the superposition unit 243.

On the basis of at least the channel information 2, the interference replica signal generation unit 242 adjusts the phase and the amplitude of an interference wave signal waveform corresponding to the interference wave information to generate the interference replica signal. Furthermore, the interference replica signal generation unit 242 also adds information for improving the accuracy of the interference replica signal, and generates the interference replica signal. Moreover, the interference replica signal generation unit 242 may also adjust transmission power in the radio transceiver 210.

Specifically, the interference replica signal generation unit 242 generates the interference replica signal such that the phase of the interference replica signal received in the UE 100-1 is opposite to the phase of the interference wave signal received in the UE 100-1. Furthermore, the eNB 200-1 generates the interference replica signal such that an amplitude of the interference replica signal received in the UE 100-1 is equal to an amplitude of the interference wave signal received in the UE 100-1.

For example, the interference replica signal generation unit 242 estimates the interference wave received waveform received in the UE 100-1 by using the interference wave information and the channel information 2. Next, the interference replica signal generation unit 242 maps (vectorizes) the interference wave received waveform on a phase plane, and rotates a phase by 180 degrees while keeping an amplitude constant, thereby generating an interference replica signal (a replica vector). However, in consideration of the difference of a CRS location or the presence or absence of DMRS (a reference signal for demodulation), it is necessary to generate a replica to correspond to a resource element position. Furthermore, the replica is not superposed on the CRS location of the serving cell.

Firstly, a method of acquiring the interference wave information will be described. The interference wave information, for example, is an interference wave signal waveform. The interference wave signal waveform is a waveform of a signal after modulation in the eNB 200-2. Alternatively, when it is possible to acquire a waveform (an opposite characteristic interference signal waveform) of a signal having a opposite phase to that and an amplitude equal to that of the interference wave signal waveform, the interference wave information may be an opposite characteristic interference signal.

When the interference wave information is the interference wave signal waveform or the opposite characteristic interference signal waveform, the network interface 220 of the eNB 200-1 receives the interference wave signal waveform or the opposite characteristic interference signal waveform from the eNB 200-2. Then, the interference replica signal generation unit 242 acquires the interference wave signal waveform or the opposite characteristic interference signal waveform received in the network interface 220.

Alternatively, the interference wave information is transmission data (user data to the UE 100-2) before being converted into an interference wave signal in the eNB 200-2. The transmission data may be transmission data before being coded or transmission data after being coded.

In addition, hereinafter, transmission data for the UE 100-1 is called "transmission data 1" and transmission data for the UE 100-2 is called "transmission data 2".

When the interference wave information is the transmission data 2, the network interface 220 of the eNB 200-1 receives the transmission data 2 from the 200-2 or the MME/S-GW 300. The interference replica signal generation unit 242 acquires the transmission data 2 received in the network interface 220.

Furthermore, when the interference wave information is the transmission data 2, the interference replica signal generation unit 242 needs to perform the same transmission processing as the transmission processing that is performed for the transmission data 2 by the eNB 200-2, and to generate the interference wave signal waveform. Accordingly, the network interface 220 of the eNB 200-1 receives, from the eNB 200-2, transmission processing information indicating the content of the transmission processing that is performed for the transmission data 2 by the eNB 200-2. The content of the transmission processing, for example, is the content of the coding process, the content of the modulation process, and the content of the resource mapping process. The interference replica signal generation unit 242 acquires the transmission processing information received in the network interface 220.

Secondly, a method of acquiring the channel information 2 will be described. Since the channel information 2 is information indicating a downlink channel characteristic, the channel information 2 is generated in the UE 100-1 in the case of FDD. On the other hand, in the case of TDD, the channel information 2 is generated in the UE 100-1 or the eNB 200-2.

In addition, when the interference wave information is the opposite characteristic interference signal waveform, it is noted that the interference replica signal generation unit 242 does not need to acquire the channel information 2.

When the channel information 2 is generated in the UE 100-1, the channel information 2 may be directly transmitted from the UE 100-1 to the eNB 200-1 or indirectly transmitted from the UE 100-1 to the eNB 200-1 via the eNB 200-2.

The network interface 220 of the eNB 200-1 receives the channel information 2 from the eNB 200-2. Alternatively, the radio transceiver 210 of the eNB 200-1 receives the channel information 2 from the UE 100-1. The interference replica signal generation unit 242 acquires the channel information 2 received in the network interface 220 or the radio transceiver 210.

Thirdly, a method of acquiring information for improving the accuracy of the interference replica signal will be described.

The information for improving the accuracy of the interference replica signal is received power information indicating received power (RSRP; Reference Signal Received Power) for a reference signal received in the UE 100-1 from the eNB 200-2. The interference replica signal generation unit 242 adds the received power information, thereby making it possible to appropriately adjust the amplitude (including transmission power) of the interference replica signal.

The received power information is generated in the UE 100-1. The received power information may be directly transmitted from the UE 100-1 to the eNB 200-1 or indirectly transmitted from the UE 100-1 to the eNB 200-1 via the eNB 200-2.

The network interface 220 of the eNB 200-1 receives the received power information from the eNB 200-2. Alternatively, the radio transceiver 210 of the eNB 200-1 receives the received power information from the UE 100-1. The interference replica signal generation unit 242 acquires the received power information received in the network interface 220 or the radio transceiver 210.

Alternatively, the information for improving the accuracy of the interference replica signal is difference information indicating at least one of an amplitude difference and a phase difference between the reference signal (CRS) and the data signal that are transmitted by the eNB 200-2. The data signal is a signal that is transmitted by the eNB 200-2 on the physical downlink shared channel (PDSCH). The interference replica signal generation unit 242 adds the difference information, thereby making it possible to appropriately adjust the amplitude and/or the phase of the interference replica signal.

The difference information is generated in the eNB 200-2. The eNB 200-2 transmits the difference information to the eNB 200-1. The network interface 220 of the eNB 200-1 receives the difference information from the eNB 200-2. The interference replica signal generation unit 242 acquires the difference information received in the network interface 220.

Alternatively, the information for improving the accuracy of the interference replica signal is power difference information indicating a power difference between a reference signal (CRS) and the data signal that are transmitted by the eNB 200-2. The interference replica signal generation unit 242 adds the power difference information, thereby making it possible to appropriately adjust the amplitude (including transmission power) of the interference replica signal.

The power difference information, for example, is power difference information (information indicating a transmission power difference) generated in the eNB 200-2. The power difference information may be directly transmitted from the eNB 200-2 to the eNB 200-1 or indirectly transmitted from the eNB 200-2 to the eNB 200-1 via the UE 100-1.

The network interface 220 of the eNB 200-1 receives the power difference information from the eNB 200-2. Alternatively, the radio transceiver 210 of the eNB 200-1 receives the power difference information from the UE 100-1. The interference replica signal generation unit 242 acquires the power difference information received in the network interface 220 or the radio transceiver 210.

Alternatively, the information for improving the accuracy of the interference replica signal is time difference information indicating a delay time difference between a delay time from the eNB 200-1 to the UE 100-1 and a delay time from the eNB 200-2 to the UE 100-1. The interference replica signal generation unit 242 adds the time difference information, thereby making it possible to appropriately adjust the transmission timing of the interference replica signal.

The time difference information is generated in the UE 100-1. The time difference information may be directly transmitted from the UE 100-1 to the eNB 200-1 or indirectly transmitted from the UE 100-1 to the eNB 200-1 via the eNB 200-2.

The network interface 220 of the eNB 200-1 receives the time difference information from the eNB 200-2. Alternatively, the radio transceiver 210 of the eNB 200-1 receives the time difference information from the UE 100-1. The interference replica signal generation unit 242 acquires the time difference information received in the network interface 220 or the radio transceiver 210.

Operation According to First Embodiment

Hereinafter, an operation according to the present embodiment will be described in sequence of an operation pattern 1 to an operation pattern 8.

(1) Operation Pattern 1

Figure 9:
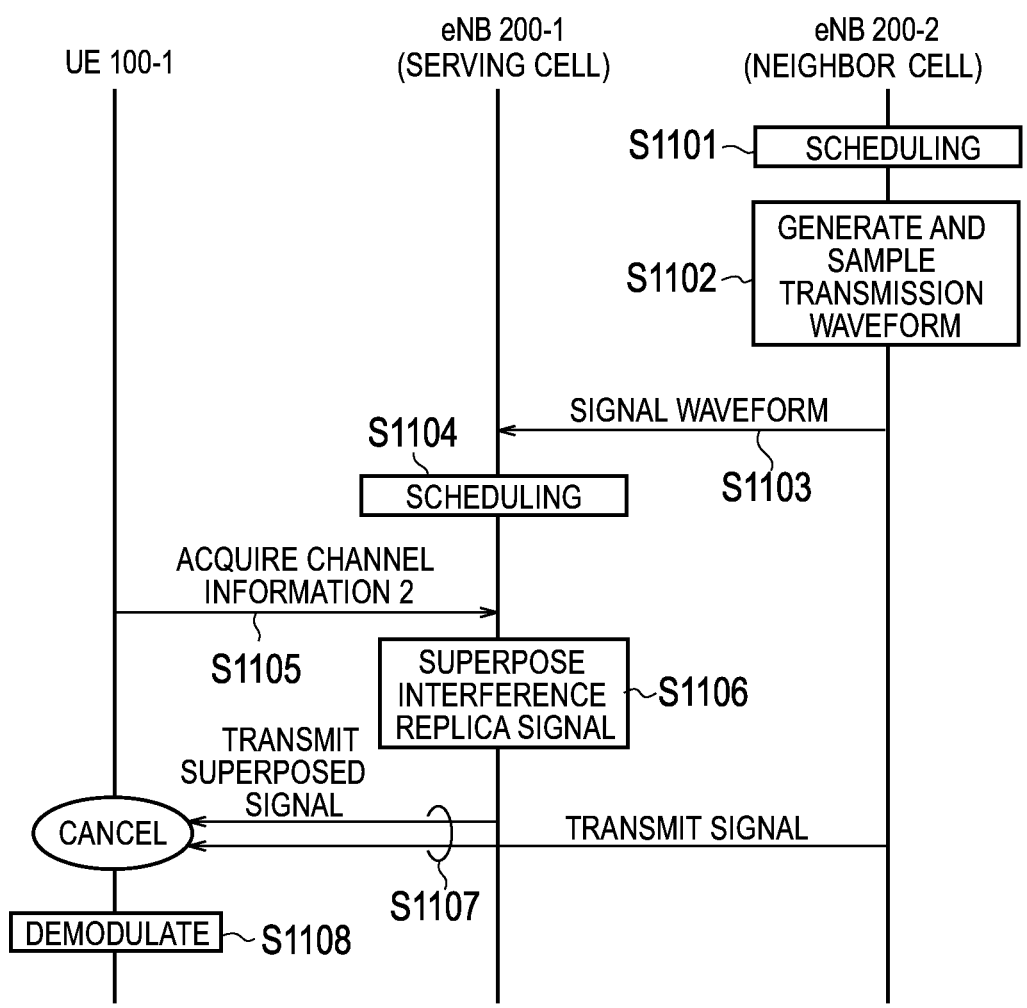
FIG. 9 is a sequence diagram of an operation pattern 1 according to the first embodiment.

FIG. 9 is a sequence diagram of an operation pattern 1 according to the present embodiment. In the operation pattern 1, interference wave information acquired by the eNB 200-1 is an interference signal waveform.

As illustrated in FIG. 9, in step S1101, the eNB 200-2 performs scheduling (or pre-scheduling) for the UE 100-2 that is connected to the cell of the eNB 200-2.

In step S1102, on the basis of a result of the scheduling, the eNB 200-2 generates a transmission signal waveform from transmission data 2 and samples the transmission signal waveform.

In step S1103, the eNB 200-2 transmits the sampled transmission signal waveform to the eNB 200-1. Furthermore, the sampled transmission signal waveform corresponds to an interference signal waveform.

In step S1104, the eNB 200-1 performs scheduling for the UE 100-1 that is connected to the cell of the eNB 200-1, and generates a transmission signal waveform (a desired wave signal waveform).

In step S1105, the eNB 200-1 acquires channel information 2. A detailed example of an operation, in which the eNB 200-1 acquires the channel information 2, will be described later.

In step S1106, on the basis of the channel information 2, the eNB 200-1 generates an opposite characteristic signal of an interference signal waveform as an interference replica signal. Then, the eNB 200-1 superposes the interference replica signal on a desired wave signal.

In step S1107, the eNB 200-2 performs transmission to the UE 100-2. The UE 100-1 receives a signal from the eNB 200-2 as an interference wave signal. Meanwhile, the eNB 200-1 transmits a superposed signal to the UE 100-1. The UE 100-1 receives the superposed signal. Furthermore, the interference wave signal is canceled by the interference replica signal included in the superposed signal.

In step S1108, the UE 100-1 demodulates the desired wave signal included in the superposed signal.

In addition, in the present operation pattern, it is mainly assumed that the interference wave signal is canceled at a UE receiving end (the state of a radio signal). However, at the time of demodulation (the state of a baseband signal), the interference wave signal may be canceled. This is the same in the following operation patterns.

Figure 10:
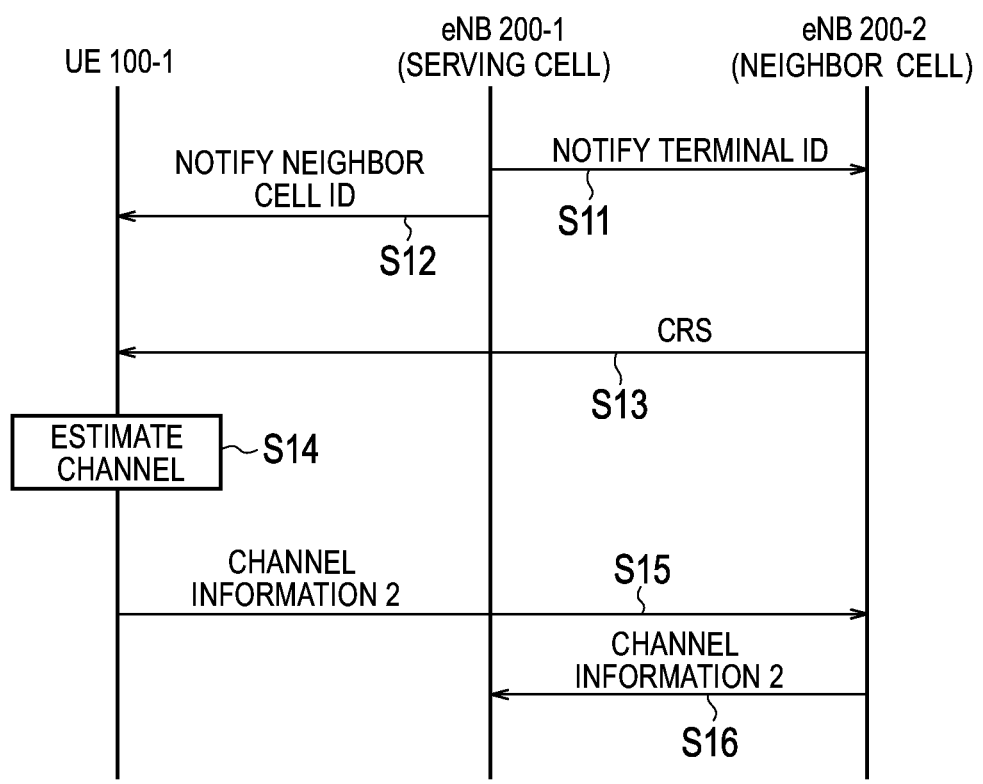
FIG. 10 is a sequence diagram of an operation example 1 in which channel information 2 is acquired according to the first embodiment.

FIG. 10 is a sequence diagram of an operation example 1 in which the eNB 200-1 acquires the channel information 2. In the present operation example, the channel information 2 is generated in the UE 100-1 and is transmitted from the UE 100-1 to the eNB 200-1 via the eNB 200-2.

As illustrated in FIG. 10, in step S11, the eNB 200-1 transmits, to the eNB 200-2, an identifier (a terminal ID) of the UE 100-1 to which the coordinated interference cancellation scheme is applied.

In step S12, the eNB 200-1 transmits, to the UE 100-1, an identifier (a cell ID) of a neighbor cell from which the UE 100-1 should acquire the channel information 2. The cell ID corresponds to cell designation information indicating a cell for which a channel characteristic should be estimated.

In step S13, the eNB 200-2 transmits a reference signal (CRS).

In step S14, on the basis of the cell ID received from the eNB 200-1, the UE 100-1 receives the reference signal (CRS) from the eNB 200-2. Then, the UE 100-1 performs channel estimation on the basis of the CRS and generates the channel information 2. As described above, the UE 100-1 estimates channel characteristic for the cell indicated by the cell ID received from the eNB 200-1, thereby generating the channel information 2.

In step S15, on the basis of the cell ID received from the eNB 200-1, the UE 100-1 transmits the channel information 2 to the eNB 200-2. Furthermore, the UE 100-1 adds the terminal ID of the UE 100-1 to the channel information 2, and transmits the channel information 2.

In step S16, on the basis of the terminal ID received from the eNB 200-1, the eNB 200-2 transfers the channel information 2, which was received from the UE 100-1, to the eNB 200-1. The eNB 200-1 receives the channel information 2 from the eNB 200-2.

Figure 11:
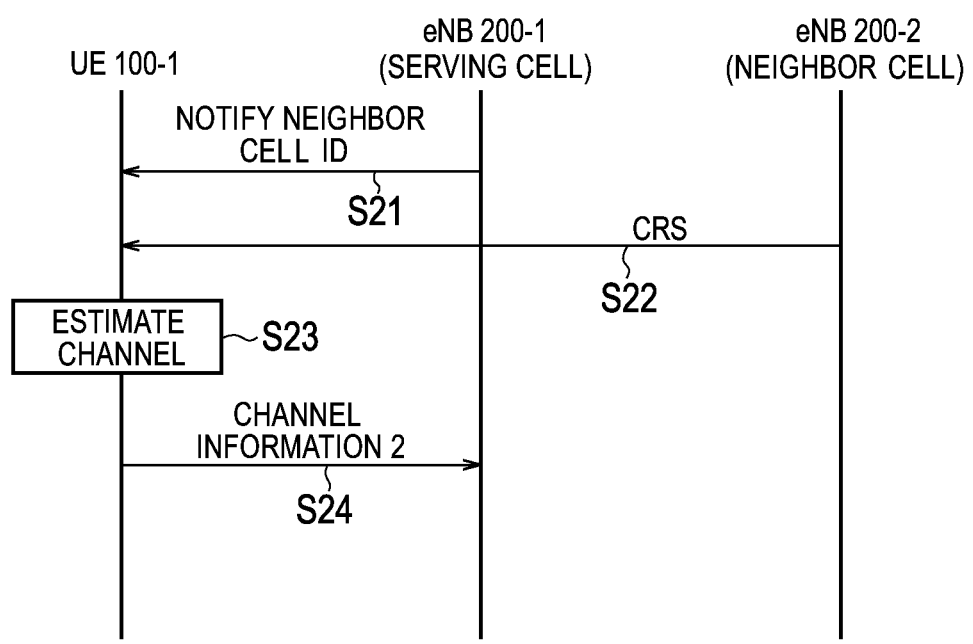
FIG. 11 is a sequence diagram of an operation example 2 in which channel information 2 is acquired according to the first embodiment.

FIG. 11 is a sequence diagram of an operation example 2 in which the eNB 200-1 acquires the channel information 2. In the present operation example, the channel information 2 is generated in the UE 100-1 and is directly transmitted from the UE 100-1 to the eNB 200-1.

As illustrated in FIG. 11, in step S21, the eNB 200-1 transmits, to the UE 100-1, an identifier (a cell ID) of a neighbor cell from which the UE 100-1 should acquire the channel information 2. The cell ID corresponds to cell designation information indicating a cell for which a channel characteristic should be estimated.

In step S22, the eNB 200-2 transmits a reference signal (CRS).

In step S23, on the basis of the cell ID received from the eNB 200-1, the UE 100-1 receives the reference signal (CRS) from the eNB 200-2. Then, the UE 100-1 performs channel estimation on the basis of the CRS and generates the channel information 2. As described above, the UE 100-1 estimates channel characteristic for the cell indicated by the cell ID received from the eNB 200-1, thereby generating the channel information 2.

In step S24, on the basis of the cell ID received from the eNB 200-1, the UE 100-1 transmits the channel information 2 to the eNB 200-1. The eNB 200-1 receives the channel information 2 from the UE 100-1.

Figure 12:
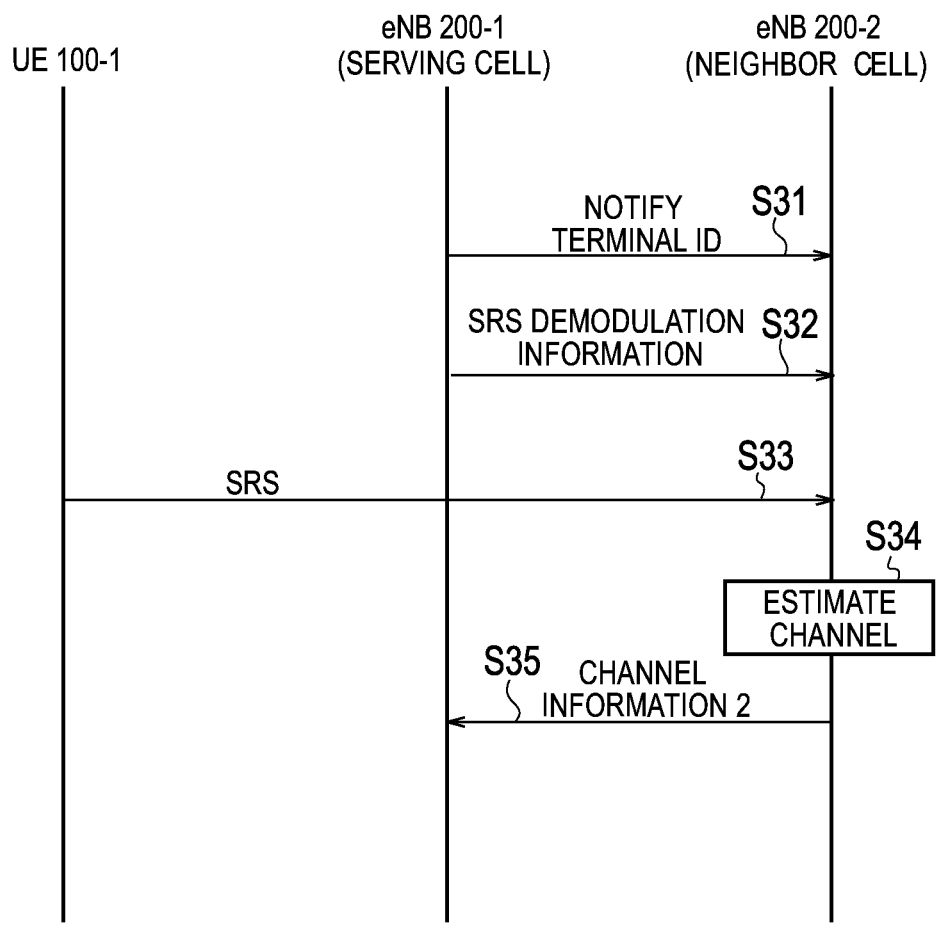
FIG. 12 is a sequence diagram of an operation example 3 in which channel information 2 is acquired according to the first embodiment.

FIG. 12 is a sequence diagram of an operation example 3 in which the eNB 200-1 acquires the channel information 2. In the present operation example, the channel information 2 is generated in the eNB 200-2 and is transmitted from the eNB 200-2 to the eNB 200-1.

As illustrated in FIG. 12, in step S31, the eNB 200-1 transmits, to the eNB 200-2, an identifier (a terminal ID) of the UE 100-1 to which the coordinated interference cancellation scheme is applied. The terminal ID corresponds to terminal designation information indicating UE for which a channel characteristic should be estimated.

In step S32, the eNB 200-1 transmits, to the eNB 200-2, SRS demodulation information for demodulating a reference signal (SRS) that is transmitted by the UE 100-1. The SRS demodulation information includes an SRS insertion subframe interval, an orthogonal code of a target UE, an SRS bandwidth, an SRS frequency domain position, an SRS hopping band and the like. The SRS demodulation information may further include a subframe start position and a system bandwidth. In addition, the eNB 200-1 may control the above-described terminal ID to be included into the SRS demodulation information, and transmit the SRS demodulation information to the eNB 200-2. In this case, step S31 may be omitted.

In step S33, the UE 100-1 transmits a reference signal (SRS).

In step S34, on the basis of the SRS demodulation information received from the eNB 200-1, the eNB 200-2 receives and demodulates the reference signal (SRS) from the UE 100-1. Then, the eNB 200-2 performs channel estimation on the basis of the SRS and generates the channel information 2.

In step S35, the eNB 200-2 transmits the channel information 2 to the eNB 200-1. The eNB 200-1 receives the channel information 2 from the eNB 200-2.

(2) Operation Pattern 2

Figure 13:
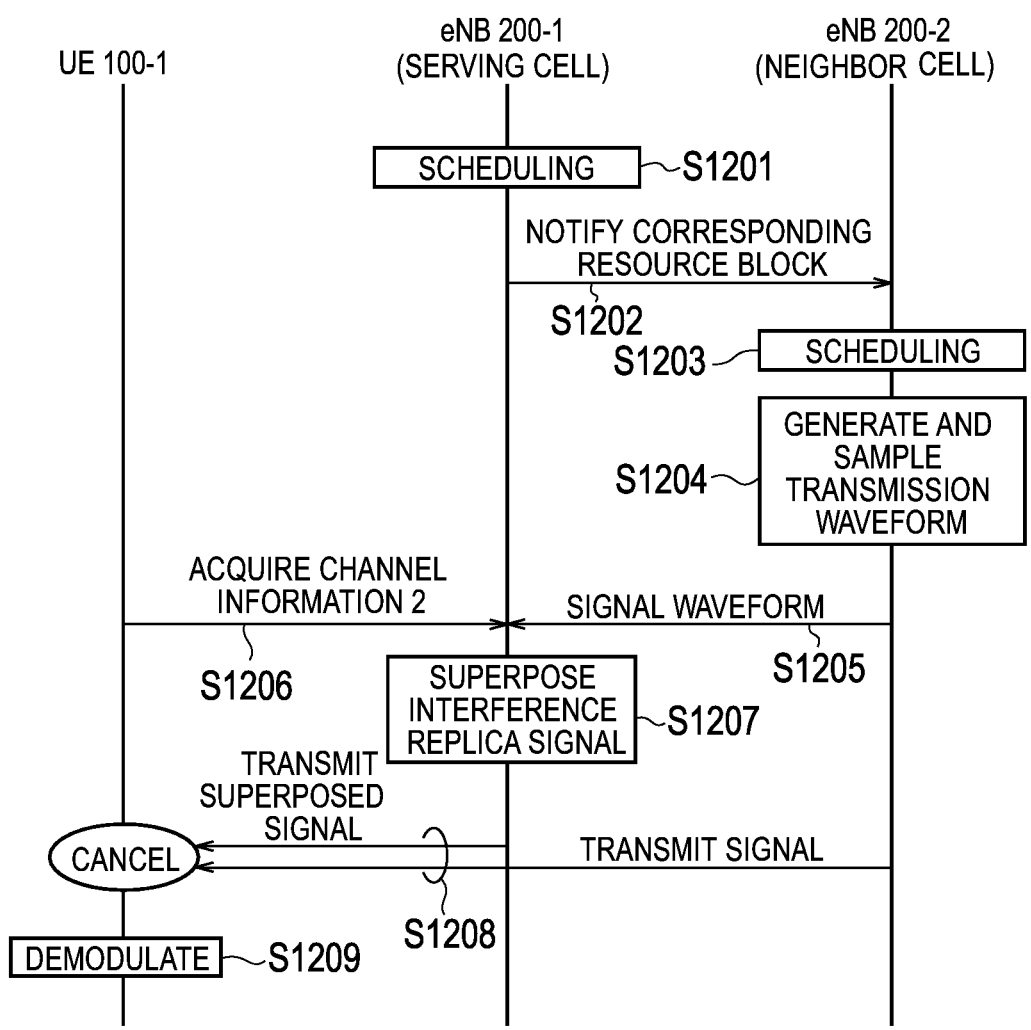
FIG. 13 is a sequence diagram of an operation pattern 2 according to the first embodiment.

FIG. 13 is a sequence diagram of an operation pattern 2 according to the present embodiment. The operation pattern 2 is obtained by changing a part of the operation pattern 1.

As illustrated in FIG. 13, in step S1201, the eNB 200-1 performs scheduling (or pre-scheduling) for the UE 100-1 that is connected to the cell of the eNB 200-1.

In step S1202, on the basis of a result of the scheduling, the eNB 200-1 transmits resource information indicating an assignment resource block for the UE 100-1 to the eNB 200-2. The resource information corresponds to information indicating a radio resource that is used in the transmission of a desired wave signal.

In step S1203, the eNB 200-2 performs scheduling for the UE 100-2 that is connected to the cell of the eNB 200-2.

In step S1204, on the basis of a result of the scheduling, the eNB 200-2 generates a transmission signal waveform from transmission data 2 with respect to a resource block corresponding to the resource information received from the eNB 200-1, and samples the transmission signal waveform.

In step S1205, the eNB 200-2 transmits the sampled transmission signal waveform to the eNB 200-1. Furthermore, the sampled transmission signal waveform corresponds to an interference signal waveform.

In step S1206, the eNB 200-1 acquires the channel information 2. An operation example in which the channel information 2 is acquired is the same as that of the aforementioned operation pattern 1.

In step S1207, on the basis of the channel information 2, the eNB 200-1 generates an opposite characteristic signal of a desired wave signal waveform as an interference replica signal. Then, the eNB 200-1 superposes the interference replica signal on a desired wave signal.

In step S1208, the eNB 200-2 performs transmission to the UE 100-2. The UE 100-1 receives a signal from the eNB 200-2 as an interference wave signal. Meanwhile, the eNB 200-1 transmits a superposed signal to the UE 100-1. The UE 100-1 receives the superposed signal. Furthermore, the interference wave signal is canceled by the interference replica signal included in the superposed signal.

In step S1209, the UE 100-1 demodulates the desired wave signal included in the superposed signal.

(3) Operation Pattern 3

Figure 14:
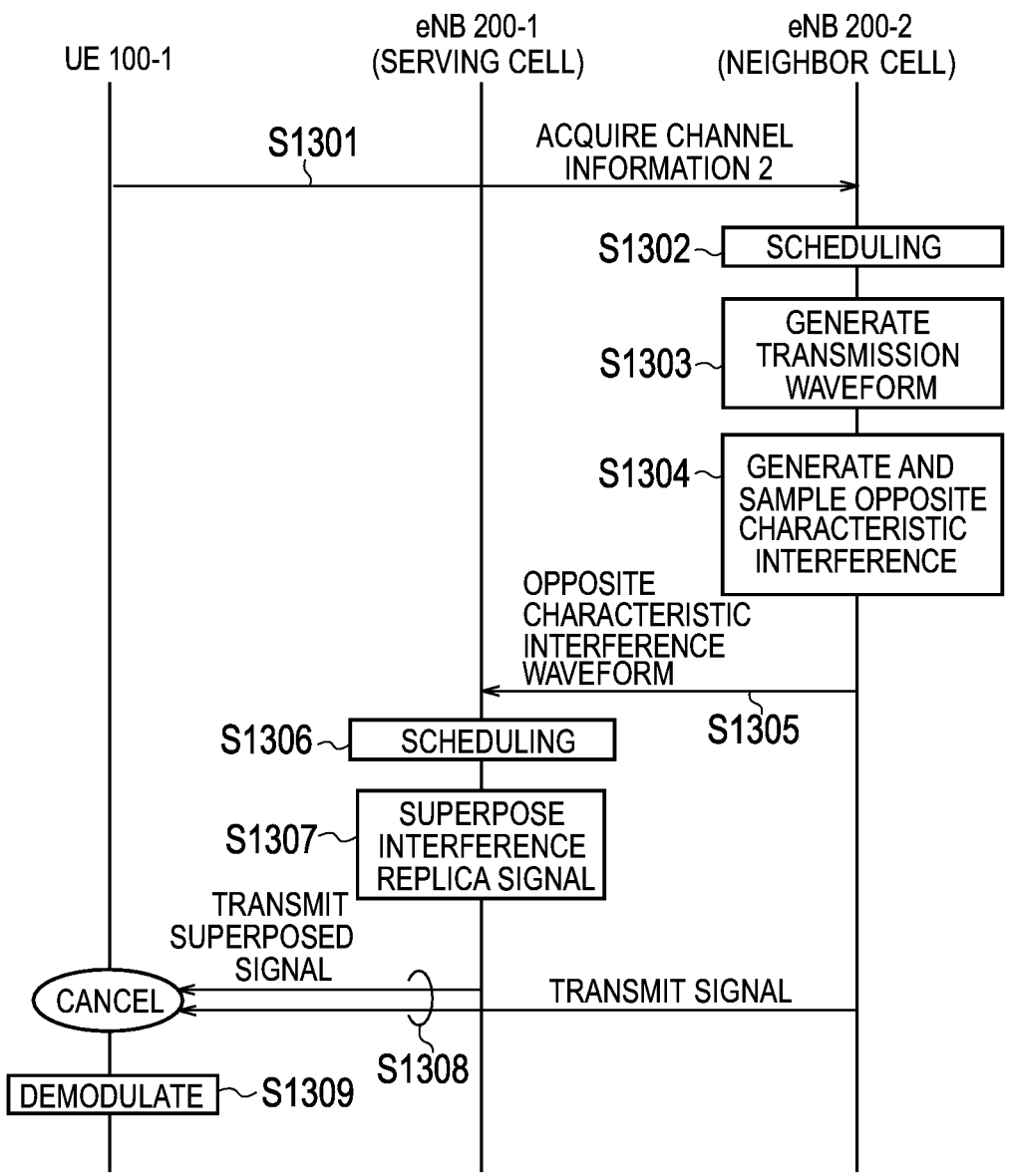
FIG. 14 is a sequence diagram of an operation pattern 3 according to the first embodiment.

FIG. 14 is a sequence diagram of an operation pattern 3 according to the present embodiment. In the operation pattern 3, interference wave information acquired by the eNB 200-1 is an opposite characteristic interference signal waveform.

As illustrated in FIG. 14, in step S1301, the eNB 200-2 acquires the channel information 2 from the UE 100-1. Alternatively, the eNB 200-2 by itself may acquire the channel information 2.

In step S1302, the eNB 200-2 performs scheduling (or pre-scheduling) for the UE 100-2 that is connected to the cell of the eNB 200-2.

In step S1303, on the basis of a result of the scheduling, the eNB 200-2 generates a transmission signal waveform (an interference wave signal waveform) from transmission data 2.

In step S1304, on the basis of the channel information 2, the eNB 200-2 generates an opposite characteristic of the interference wave signal waveform as an opposite characteristic interference waveform, and samples the opposite characteristic interference waveform.

In step S1305, the eNB 200-2 transmits the sampled opposite characteristic interference waveform to the eNB 200-1.

In addition, similarly to the aforementioned operation pattern 2, a waveform notification may be performed on the basis of resource information. Specifically, before step S1302, the eNB 200-1 transmits resource information indicating an assignment resource block for the UE 100-1 to the eNB 200-2, and the eNB 200-2 generates and samples a transmission signal waveform for a resource block corresponding to the resource information. In this way, it is advantageous that the amount of a signal transmitted on the X2 interface is reduced and it is enough for the eNB 200-1 simply to superpose an opposite characteristic signal.

In step S1306, the eNB 200-1 performs scheduling for the UE 100-1 that is connected to the cell of the eNB 200-1, and generates a transmission signal waveform (a desired wave signal waveform).

In step S1307, the eNB 200-1 generates an interference replica signal by the opposite characteristic interference waveform received from the eNB 200-2. Then, the eNB 200-1 superposes the interference replica signal on a desired wave signal.

In step S1308, the eNB 200-2 performs transmission to the UE 100-2. The UE 100-1 receives a signal from the eNB 200-2 as an interference wave signal. Meanwhile, the eNB 200-1 transmits a superposed signal to the UE 100-1. The UE 100-1 receives the superposed signal. Furthermore, the interference wave signal is canceled by the interference replica signal included in the superposed signal.

In step S1309, the UE 100-1 demodulates the desired wave signal included in the superposed signal.

(4) Operation Pattern 4

Figure 15:
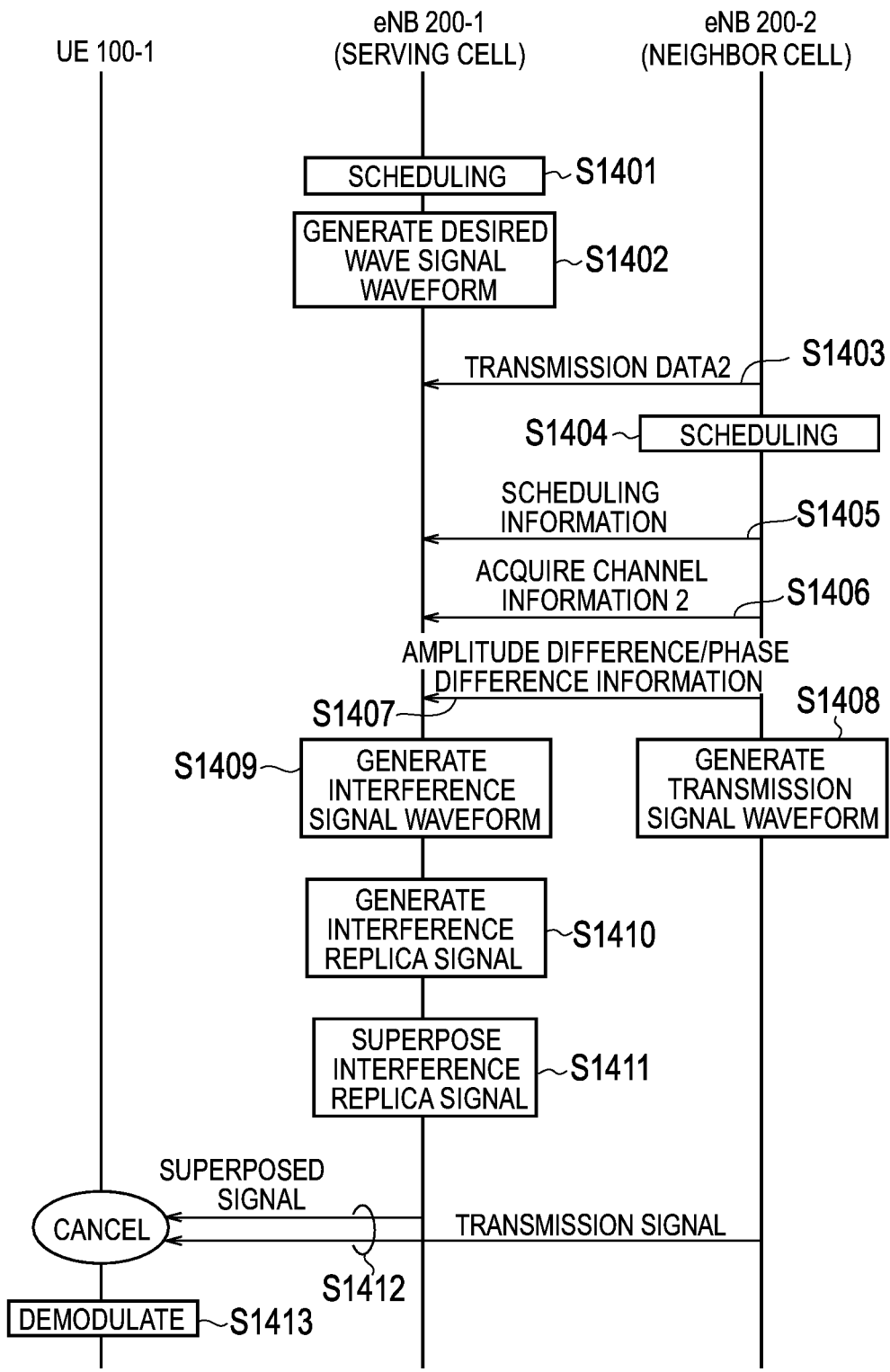
FIG. 15 is a sequence diagram of an operation pattern 4 according to the first embodiment.

FIG. 15 is a sequence diagram of an operation pattern 4 according to the present embodiment. In the operation pattern 4, interference wave information acquired by the eNB 200-1 is transmission data (transmission data 2) for the UE 100-2.

As illustrated in FIG. 15, in step S1401, the eNB 200-1 performs scheduling (or pre-scheduling) for the UE 100-1 that is connected to the cell of the eNB 200-1.

In step S1402, on the basis of a result of the scheduling, the eNB 200-1 generates a transmission signal waveform (a desired wave signal waveform) from transmission data (transmission data 1) for the UE 100-1.

In step S1403, the eNB 200-2 transmits the transmission data 2 to the eNB 200-1.

In addition, similarly to the aforementioned operation pattern 2, data notification may also be performed on the basis of resource information. Specifically, before step S1403, the eNB 200-1 transmits the resource information indicating an assignment resource block for the UE 100-1 to the eNB 200-2, and the eNB 200-2 transmits the transmission data 2 corresponding to the resource information to the eNB 200-2. In this way, it is possible to reduce the amount of a signal transmitted on the X2 interface.

In step S1404, the eNB 200-2 performs scheduling (or pre-scheduling) for the UE 100-2 that is connected to the cell of the eNB 200-2.

In step S1405, on the basis of a result of the scheduling, the eNB 200-2 transmits scheduling information to the eNB 200-1. The scheduling information corresponds to transmission processing information indicating the content of transmission processing when the transmission data 2 is converted into a transmission signal (an interference wave signal).

In step S1406, the eNB 200-1 acquires channel information 2. An operation, in which the eNB 200-1 acquires the channel information 2, is the same as that of the aforementioned operation pattern 1.

In step S1407, the eNB 200-2 transmits, to the eNB 200-1, difference information indicating at least one of an amplitude difference and a phase difference between a reference signal (CRS) and a data signal that are transmitted by the eNB 200-2. The eNB 200-2 may transmit difference information for each resource block to the eNB 200-1.

In addition, the transmission of the difference information from the eNB 200-2 to the eNB 200-1 is not limited to the present operation pattern, and is also applicable to the aforementioned operation patterns and operation patterns to be described later. Furthermore, as described in the aforementioned operation pattern 2, when the assignment resource block for the UE 100-1 is notified from the eNB 200-1 to the eNB 200-2, the eNB 200-2 may also transmit difference information only on the assignment resource block to the eNB 200-1.

In step S1408, on the basis of a result of the scheduling (step S1404), the eNB 200-2 generates a transmission signal waveform (an interference wave signal waveform) from the transmission data 2.

In step S1409, the eNB 200-1 performs transmission processing, which is indicated by the scheduling information (transmission processing information) received from the eNB 200-2, with respect to the transmission data 2 received from the eNB 200-2, thereby generating an interference signal waveform.

In step S1410, on the basis of the channel information 2, the eNB 200-1 generates an opposite characteristic signal of the interference signal waveform as an interference replica signal. At this time, on the basis of the difference information received from the eNB 200-2, the eNB 200-1 adjusts the phase and the amplitude of the interference replica signal.

In step S1411, the eNB 200-1 superposes the interference replica signal on a desired wave signal.

In step S1412, the eNB 200-2 performs transmission to the UE 100-2. The UE 100-1 receives a signal from the eNB 200-2 as an interference wave signal. Meanwhile, the eNB 200-1 transmits a superposed signal to the UE 100-1. The UE 100-1 receives the superposed signal. Furthermore, the interference wave signal is canceled by the interference replica signal included in the superposed signal.

In step S1413, the UE 100-1 demodulates the desired wave signal included in the superposed signal.

(5) Operation Pattern 5

Figure 16:
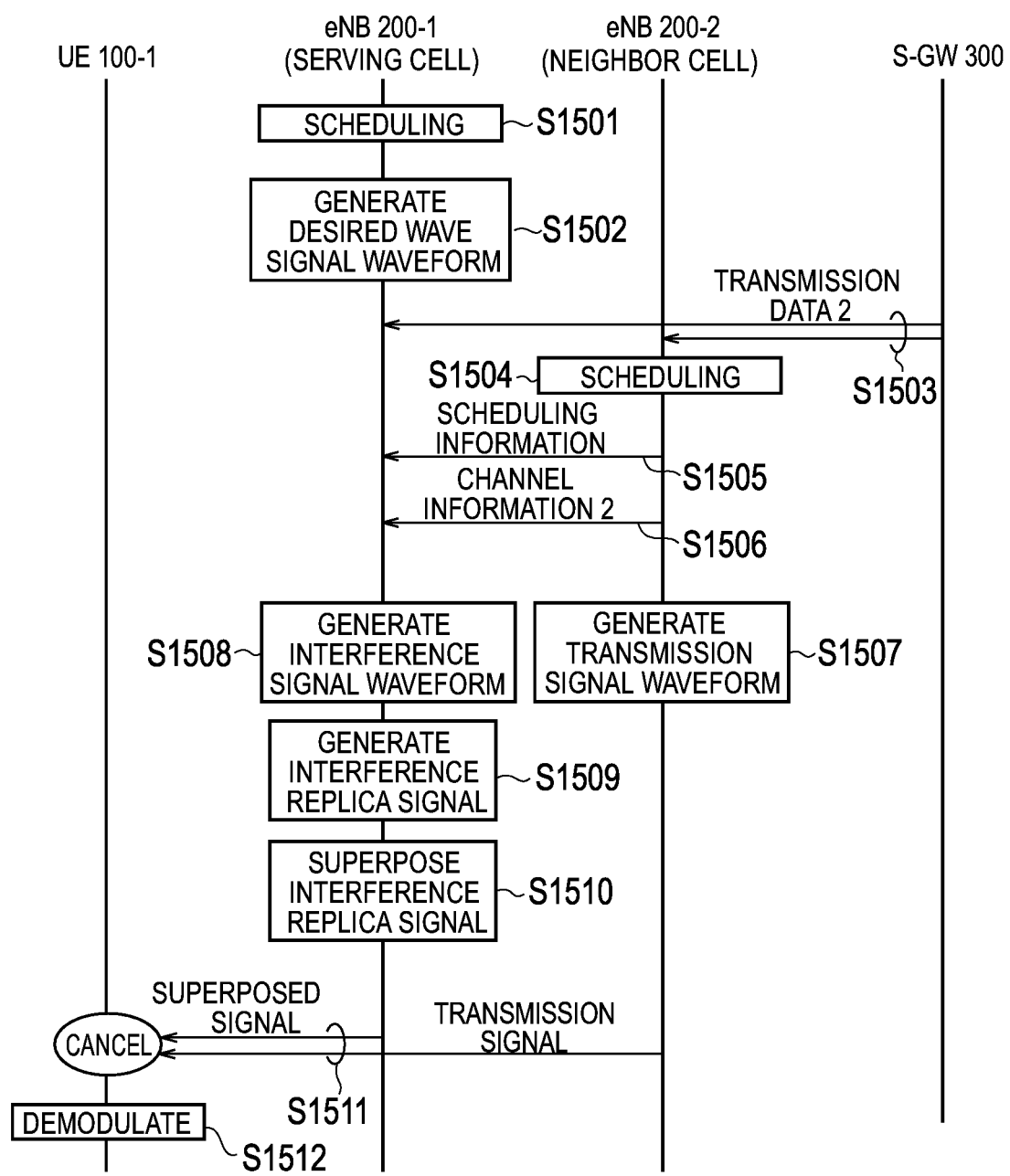
FIG. 16 is a sequence diagram of an operation pattern 5 according to the first embodiment.

FIG. 16 is a sequence diagram of an operation pattern 5 according to the present embodiment. The operation pattern 5 is obtained by changing a part of the operation pattern 4.

As illustrated in FIG. 16, in step S1501, the eNB 200-1 performs scheduling (or pre-scheduling) for the UE 100-1 that is connected to the cell of the eNB 200-1.

In step S1502, on the basis of a result of the scheduling, the eNB 200-1 generates a transmission signal waveform (a desired wave signal waveform) from transmission data (transmission data 1) for the UE 100-1.

In step S1503, the S-GW 300 transmits the transmission data 2 to the eNB 200-1 and the eNB 200-2. In the present operation pattern, the S-GW 300 corresponds to a management device.

In step S1504, the eNB 200-2 performs scheduling (or pre-scheduling) for the UE 100-2 that is connected to the cell of the eNB 200-2.

In step S1505, on the basis of a result of the scheduling, the eNB 200-2 transmits scheduling information to the eNB 200-1. The scheduling information corresponds to transmission processing information indicating the content of transmission processing when the transmission data 2 is converted into a transmission signal (an interference wave signal).

In step S1506, the eNB 200-1 acquires channel information 2. An operation, in which the eNB 200-1 acquires the channel information 2, is the same as that of the aforementioned operation pattern 1.

In step S1507, on the basis of a result of the scheduling (step S1504), the eNB 200-2 generates a transmission signal waveform (an interference wave signal waveform) from the transmission data 2.

In step S1508, the eNB 200-1 performs transmission processing, which is indicated by the scheduling information (transmission processing information) received from the eNB 200-2, with respect to the transmission data 2 received from the eNB 200-2, thereby generating an interference signal waveform.

In step S1509, on the basis of the channel information 2, the eNB 200-1 generates an opposite characteristic signal of the interference signal waveform as an interference replica signal.

In step S1510, the eNB 200-1 superposes the interference replica signal on a desired wave signal.

In step S1511, the eNB 200-2 performs transmission to the UE 100-2. The UE 100-1 receives a signal from the eNB 200-2 as an interference wave signal. Meanwhile, the eNB 200-1 transmits a superposed signal to the UE 100-1. The UE 100-1 receives the superposed signal. Furthermore, the interference wave signal is canceled by the interference replica signal included in the superposed signal.

In step S1512, the UE 100-1 demodulates the desired wave signal included in the superposed signal.

(6) Operation Pattern 6

Figure 17:
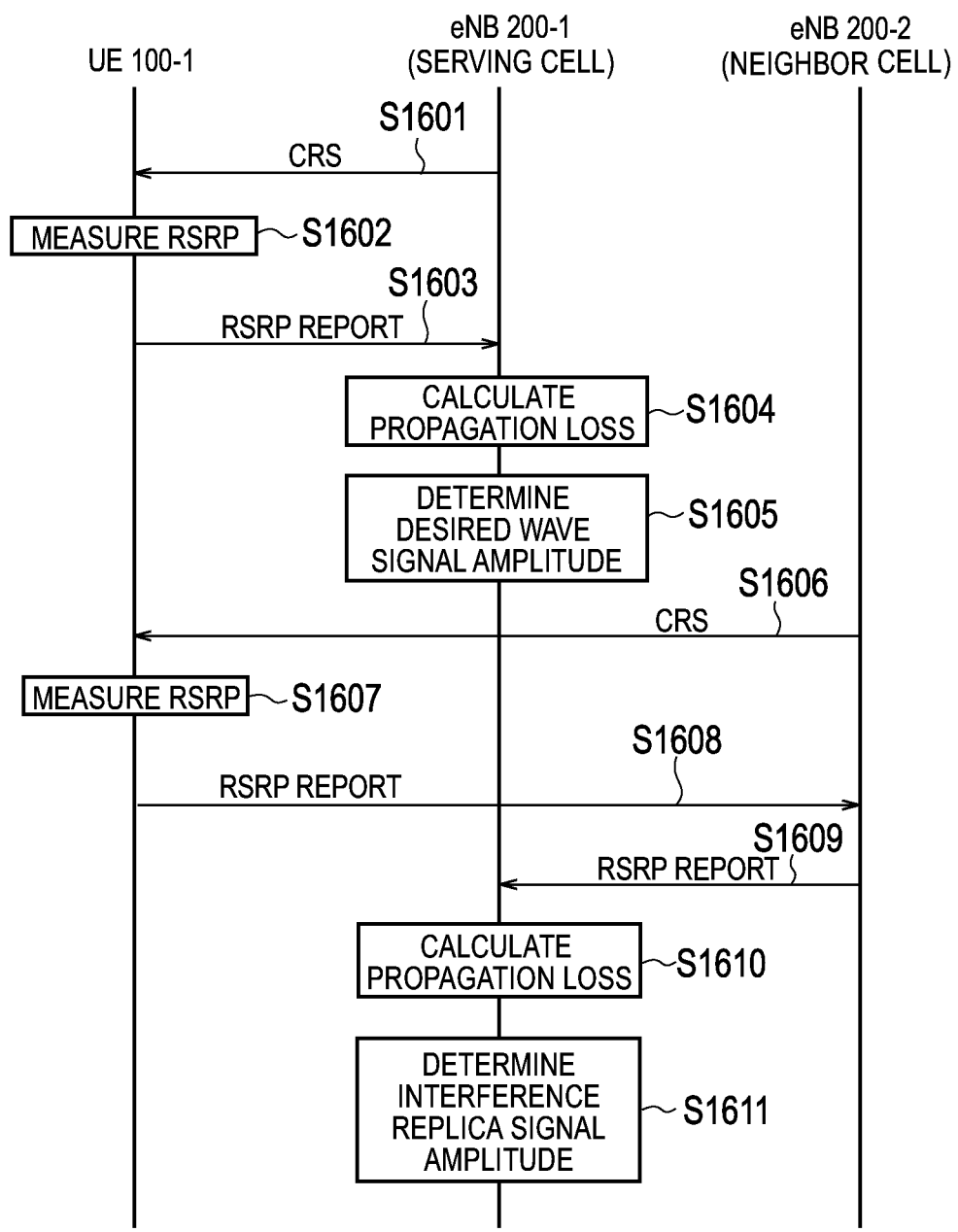
FIG. 17 is a sequence diagram of an operation pattern 6 according to the first embodiment.

FIG. 17 is a sequence diagram of an operation pattern 6 according to the present embodiment. The operation pattern 6 is an operation pattern for appropriately adjusting the amplitude of an interference replica signal. The operation pattern 6 is performed through a combination with any one of the aforementioned operation patterns 1 to 5.

As illustrated in FIG. 17, in step S1601, the eNB 200-1 transmits a reference signal (CRS). The UE 100-1 receives the CRS.

In step S1602, the UE 100-1 measures the received power (RSRP1) of the CRS received from the eNB 200-1.

In step S1603, the UE 100-1 transmits the RSRP1 (RSRP report) to the eNB 200-1.

In step S1604, the eNB 200-1 subtracts the RSRP1 from the transmission power of the CRS, thereby calculating propagation loss (propagation loss 1) between the UE 100-1 and the eNB 200-1.

In step S1605, on the basis of the propagation loss 1, the eNB 200-1 adjusts the amplitude of a desired wave signal.

In step S1606, the eNB 200-2 transmits the CRS. The UE 100-1 receives the CRS.

In step S1607, the UE 100-1 measures the received power (RSRP2) of CRS received from the eNB 200-2.

In step S1608, the UE 100-1 transmits the RSRP2 to the eNB 200-2.

In step S1609, the eNB 200-2 transfers the RSRP2 received from the UE 100-1 to the eNB 200-1. Furthermore, the eNB 200-2 may transfer the RSRP2 to the eNB 200-1 in response to a pre-request from the eNB 200-1.

In addition, the UE 100-1 may not transmit the RSRP2 to the eNB 200-2, but directly transmit the RSRP2 to the eNB 200-1.

In step S1610, the eNB 200-1 subtracts the RSRP2 from the transmission power of the CRS, thereby calculating propagation loss (propagation loss 2) between the UE 100-1 and the eNB 200-2.

In step S1611, on the basis of the propagation loss 2, the eNB 200-1 adjusts the amplitude of an interference replica signal.

In addition, when the eNB 200-1 and/or the eNB 200-2 transmits a reference signal (specifically, CSI-RS) other than the CRS, the UE 100-1 may also measure the received power of the CSI-RS, and may transmit the received power of the CSI-RS to the eNB 200-1 or the eNB 200-2. In this case, information indicating the type (the CRS or the CSI-RS) of the received power may be added.

(7) Operation Pattern 7

Figure 18:
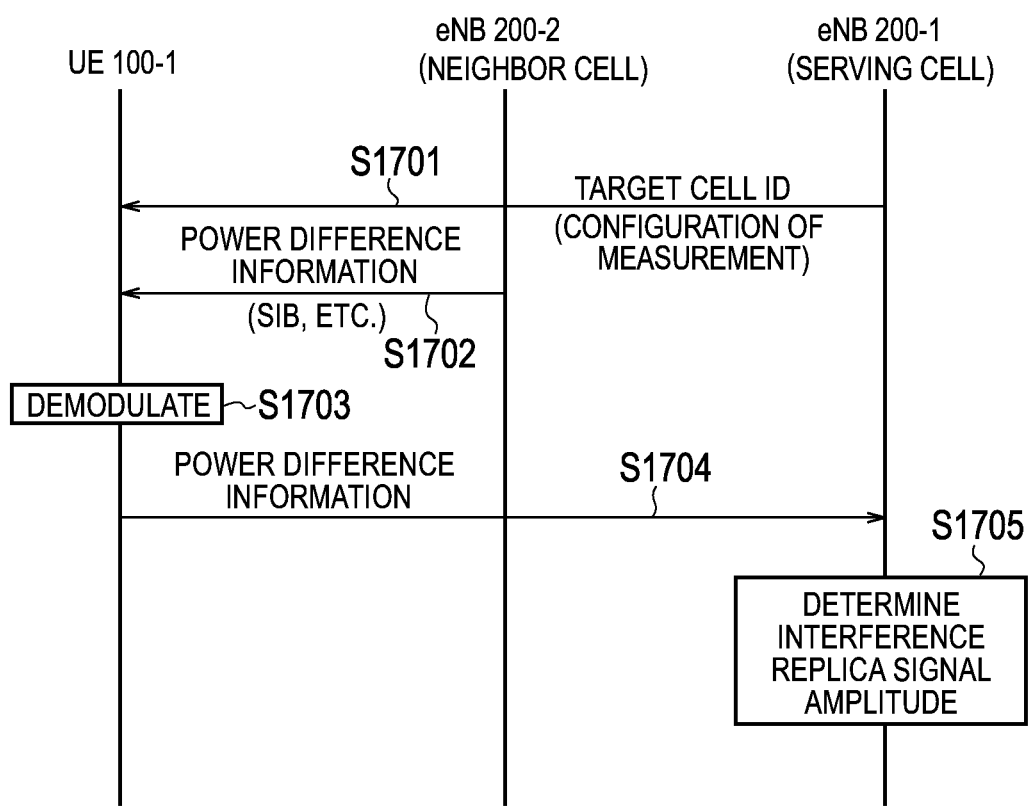
FIG. 18 is a sequence diagram of an operation pattern 7 according to the first embodiment.

FIG. 18 is a sequence diagram of an operation pattern 7 according to the present embodiment. The operation pattern 7 is an operation pattern for appropriately adjusting the amplitude of an interference replica signal. The operation pattern 7 is performed through a combination with any one of the aforementioned operation patterns 1 to 5.

As illustrated in FIG. 18, in step S1701, the eNB 200-1 transmits an identifier (a cell ID) of a neighbor cell (a cell managed by the eNB 200-2) to the UE 100-1.

In step S1702, on the basis of the cell ID received from the eNB 200-1, the UE 100-1 receives system information (SIB; System Information Block) that is transmitted by the eNB 200-2. In the present operation pattern, the SIB includes power difference information indicating a power difference (a transmission power difference) between a reference signal and a data signal that is transmitted by the eNB 200-2.

In step S1703, the UE 100-1 demodulates the SIB to acquire the power difference information included in the SIB.

In step S1704, the UE 100-1 transmits the power difference information to the eNB 200-1.

In step S1705, on the basis of the power difference information received from the UE 100-1, the eNB 200-1 adjusts the amplitude of an interference replica signal.

In addition, in the present operation pattern, the power difference information is transmitted from the eNB 200-2 to the eNB 200-1 via the UE 100-1. However, the power difference information may be directly transmitted from the eNB 200-2 to the eNB 200-1. In this case, the eNB 200-2 may also transmit the power difference information to the eNB 200-1 in response to a request from the eNB 200-1.

(8) Operation Pattern 8

Figure 19:
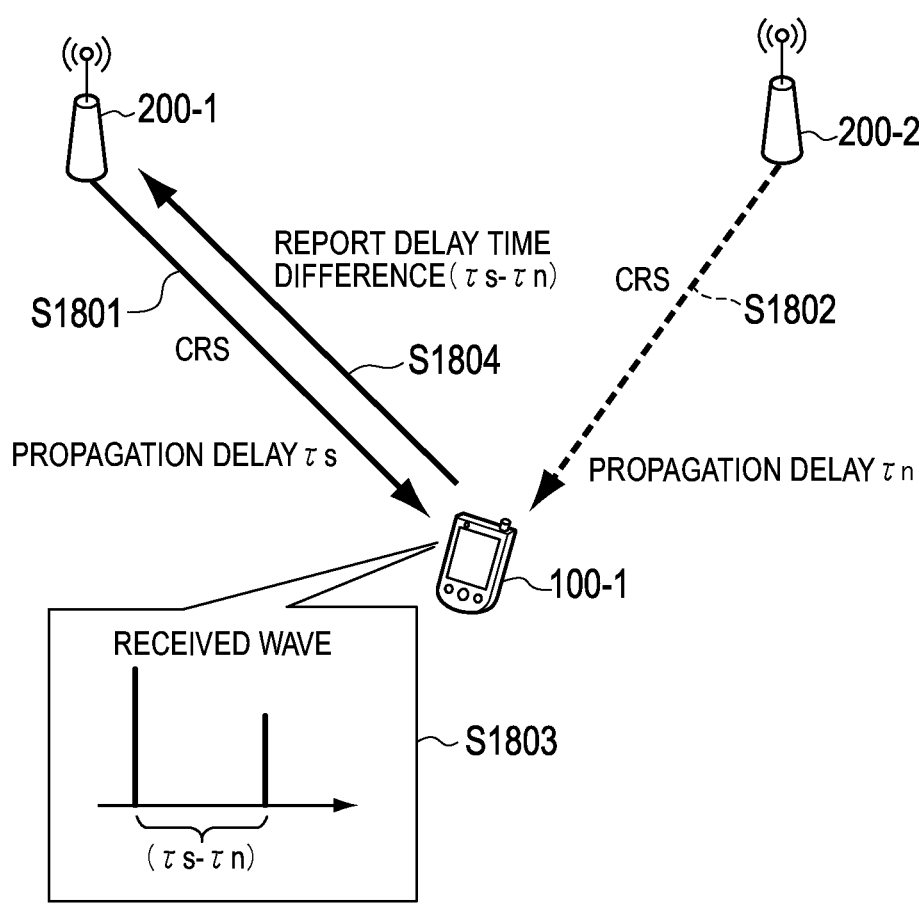
FIG. 19 is a sequence diagram of an operation pattern 8 according to the first embodiment.

FIG. 19 is a sequence diagram of an operation pattern 8 according to the present embodiment. The operation pattern 8 is an operation pattern for appropriately adjusting the transmission timing (the superposed timing) of an interference replica signal. The operation pattern 8 is performed through a combination with any one of the aforementioned operation patterns 1 to 5.

As illustrated in FIG. 19, in step S1801, the eNB 200-1 transmits a reference signal (CRS). The CRS transmitted by the eNB 200-1 is received in the UE 100-1 after propagation delay $\tau S$.

In step S1802, the eNB 200-2 transmits CRS simultaneously with the transmission of the CRS by the eNB 200-1. The CRS transmitted by the eNB 200-2 is received in the UE 100-1 after propagation delay in.

In step S1803, the UE 100-1 generates a difference between the reception timing of the CRS from the eNB 200-1 and the reception timing of the CRS from the eNB 200-2 as time difference information. That is, the time difference information is information indicating a delay time difference between the delay time $\tau S$ from the eNB 200-1 to the UE 100-1 and the delay time $\tau n$ from the eNB 200-2 to the UE 100-1.

In step S1804, the UE 100-1 transmits the time difference information to the eNB 200-1. On the basis of the time difference information received from the UE 100-1, the eNB 200-1 adjusts the transmission timing (the superposed timing) of an interference replica signal.

In addition, in the present operation pattern, the eNB 200-1 and the eNB 200-2 simultaneously transmit the CRS. However, when the transmission timings of the CRS are different from each other, it is sufficient if transmission timing difference information is shared by the eNB 200-1 and the eNB 200-2 and the time difference information received from the UE 100-1 is corrected. Alternatively, when the UE 100-1 side knows the transmission timing difference information (a difference between subframe numbers, a difference between symbol numbers, and the like), the UE 100-1 may correct the information and report a delay time difference.

Furthermore, in the present operation pattern, the CRS is used as the reference signal. However, instead of the CRS, CSI-RS may be used. Moreover, the UE 100-1 may also transmit information indicating a difference between the received power of the CRS from the eNB 200-1 and the received power of the CRS from the eNB 200-2, together with the time difference information.

Second Embodiment

Hereinafter, a second embodiment will be described while focusing on differences from the aforementioned first embodiment.

The present embodiment is an embodiment in which degree at which an interference replica signal cancels an interference wave signal, that is, an effect of interference cancellation, can be evaluated in the coordinated interference cancellation scheme.

FIG. 20 is a diagram for explaining an operation according to the present embodiment.

As illustrated in FIG. 20, an operation environment according to the present embodiment is similar to that of the first embodiment. Therefore, the UE 100-1 receives a desired wave signal from the serving cell (eNB 200-1) and also receives an interference wave signal from the neighbor cell (eNB 200-2) adjacent to the serving cell. The eNB 200-1 superposes an interference replica signal corresponding to the interference wave signal on the desired wave signal so as to cancel the interference wave signal received by the UE 100-1.

In the present embodiment, the interference replica signal includes a CSI-RS replica signal (CSI-RS opposite characteristic signal) that is a replica signal for canceling the CSI-RS (first reference signal) included in the interference wave signal. The CSI-RS replica signal is generated in much the same way as the interference replica signal. Specifically, the eNB 200-1 generates the CSI-RS replica signal such that a phase of the CSI-RS replica signal received in the UE 100-1 is opposite to a phase of the interference wave signal received from the eNB 200-2 in the UE 100-1. Furthermore, the eNB 200-1 generates the CSI-RS replica signal such that an amplitude of the CSI-RS replica signal received in the UE 100-1 is equal to an amplitude of the interference wave signal received from the eNB 200-2 in the UE 100-1.

When the interference replica signal (including CSI-RS replica signal) is ideally generated, the interference wave signal (including CSI-RS) received in the UE 100-1 is completely canceled and the received power of the interference replica signal (including CSI-RS replica signal) in the UE 100-1 becomes zero unless channel state changes. However, the interference replica signal is not always ideally generated, and thus, it is desirable to evaluate the effect of interference cancellation and to reflect the evaluation result, for example, in the scheduling (MCS determination, etc.) in the eNB 200-1.

Therefore, in the present embodiment, the UE 100-1 measures $P_{CSI-RS1}$ (first received power) that is received power of the CSI-RS from the eNB 200-2 under a situation where the interference replica signal is superposed on the desired wave signal. The UE 100-1 notifies the eNB 200-1 of $P_{CSI}$-RS1. Alternatively, the UE 100-1 notifies the eNB 200-1 of a reception quality index value based on $P_{CSI-RS1}$. In the present embodiment, the reception quality index value based on $P_{CSI-RS1}$ is the desired wave-to-interference wave ratio (SIR) or the interference cancellation ratio. The eNB 200-1 performs scheduling (MCS determination, etc.) for the UE 100-1 on the basis of the notification from the UE 100-1, for example.

Operation According to Second Embodiment (1) Operation Pattern 1

FIG. 21 is a sequence diagram of an operation pattern 1 according to the present embodiment.

As shown in FIG. 21, in step S3101, the eNB 200-2 transmits, to the eNB 200-1, CSI-RS signal information related to CSI-RS that is transmitted from the eNB 200-2. Herein, the eNB 200-2 may transmit the CSI-RS signal information in the interference wave information, to the eNB 200-1. The eNB 200-1 generates the interference replica signal (including the CSI-RS replica signal) on the basis of interference wave information (including CSI-RS signal information).

In step S3102, the eNB 200-1 transmits, to the UE 100-1, the interference replica signal (including the CSI-RS replica signal) by superposing the interference replica signal on a desired wave signal. The eNB 200-2 transmits the interference wave signal (including the CSI-RS). The interference wave signal (including the CSI-RS) received by the UE 100-1 is canceled by the interference replica signal (including the CSI-RS replica signal).

In step S3103, the UE 100-1 measures $P_{CSI-RS1}$ that is received power of the CSI-RS from the eNB 200-2.

In step S3104, the UE 100-1 stores $P_{CSI-RS1}$.

Steps S3105 to S3109 are optional procedures to obtain an interference signal cancellation ratio.

In step S3105, the eNB 200-2 transmits, to eNB 200-1, CSI-RS signal information related to the CSI-RS that is transmitted from the eNB 200-2. Herein, the eNB 200-2 may transmit the CSI-RS signal information in the interference wave information, to the eNB 200-1.

In step S3106, the eNB 200-2 transmits an interference wave signal (including the CSI-RS). In this case, the eNB 200-1 does not transmit an interference replica signal (including a CSI-RS replica signal), and thus, the interference wave signal (including the CSI-RS) received by the UE 100-1 is not canceled.

In step S3107, the UE 100-1 measures $P_{CSI-RS2}$ (third received power) that is received power of the CSI-RS from the eNB 200-2 under a situation where the interference replica signal is not superposed on the desired wave signal.

In step S3108, the UE 100-1 calculates an interference cancellation ratio indicating a ratio of $P_{CSI-RS1}$ and $P_{CSI-RS2}$. For example, the interference cancellation ratio may be calculated by a calculation formula of $P_{CSI-RS2}$ divided by $P_{CSI-RS1}$ or by a calculation formula of $P_{CSI-RS2}-P_{CSI-RS1}$.

In step S3109, the UE 100-1 stores the interference cancellation ratio.

Steps S3110 to S3114 are optional procedures to obtain SIR.

In step S3110, the eNB 200-1 transmits CRS (second reference signal).

In step S3111, the UE 100-1 measures $P_{CRS}$ (second received power) that is received power of the CRS from the eNB 200-1.

In step S3112, the UE 100-1 calculates SIR indicating a ratio of $P_{CSS}$ and $P_{CSI-RS1}$. For example, SIR may be calculated by a calculation formula of $P_{CRS}$ divided by $P_{CSI-RS1}$ or by a calculation formula of $P_{CRS}-P_{CSI-RS1}$.

In step S3113, the UE 100-1 stores SIR.

In step S3114, the UE 100-1 transmits, to the eNB 200-1, at least one of $P_{CSI-RS1}$, the interference cancellation ratio and SIR. The eNB 200-1 performs scheduling (MCS determination, etc.) for the UE 100-1 on the basis of at least one of $P_{CIS-RS1}$, the interference cancellation ratio and SIR. Further, On the basis of the interference cancellation ratio, the eNB 200-1 may determine the necessity of the coordinated interference cancellation scheme and may adjust the interference replica signal. For example, the eNB 200-1 may adjust the interference replica signal by generating an interference replica signal of which the accuracy is high (that is, high-resolution). When the eNB 200-1 receives the signal waveform (for example, signal waveform of CSI-RS) included in the interference wave information in the S3101, the eNB 200-1 may require higher-resolution signal waveform than the signal waveform via the X2 interface.

(2) Operation Pattern 2

FIG. 22 is a sequence diagram of an operation pattern 2 according to the present embodiment.

As shown in FIG. 22, procedures of steps S3201 to S3204 are in much the same way as those in the operation pattern 1 according to the present embodiment.

Steps S3205 to S3210 are procedures to obtain the interference signal cancellation ratio. The procedures are different from those for obtaining an interference signal cancellation ratio in the operation pattern 1 according to the present embodiment.

In step S3205, the eNB 200-2 transmits, to the eNB 200-1, $R_{CRS}$ indicating a ratio of transmission power of the CRS of the eNB 200-2 and transmission power of the CSI-RS of the eNB 200-2.

In step S3206, the eNB 200-1 transfers, to the UE 100-1, the $R_{CRS}$ received from the eNB 200-2.

It is noted that $R_{CRS}$ may be transmitted directly from the eNB 200-2 to the UE 100-1 although $R_{CRS}$ is transmitted from the eNB 200-2 to the UE 100-1 via the eNB 200-1 in steps S3205 and S3206.

In step S3207, the eNB 200-2 transmits CRS (third reference signal).

In step S3208, the UE 100-1 measures $P_{CRS\_N}$ (fourth received power) that is received power of the CRS from the eNB 200-2.

In step S3209, an interference cancellation ratio is calculated on the basis of $P_{CSI-RS1}$, $P_{CRS\_N}$ and $R_{CRS}$.

Herein, the UE 100-1 estimates $P_{CSI-RS2}$ that is received power of the CSI-RS from the eNB 200-2 under a situation where the interference replica signal is not superposed on the desired wave signal on the basis of $P_{CRS\_N}$ and $R_{CRS}$. Then, the UE 100-1 calculates an interference cancellation ratio indicating a ratio of $P_{CSI-RS1}$ and $P_{CSI-RS2}$. For example, the interference cancellation ratio may be calculated by a calculation formula of $P_{CSI-RS2}$ divided by $P_{CSI-RS1}$ or by a calculation formula of $P_{CSI-RS2}-P_{CSI-RS1}$.

Alternatively, the UE 100-1 estimates received power $P_{CRS\_N'}$ ($P_{CSI-RS1}+R_{CRS}$, or $P_{CSI-RS1} \times R_{CRS}$) of the CRS when it is assumed that the CRS from the eNB 200-2 is canceled, on the basis of $P_{CSI-RS1}$ and $R_{CRS}$. Then, the UE 100-1 calculates an interference cancellation ratio indicating a ratio of $P_{CRS\_N}$ and $P_{CRS\_N'}$. For example, the interference cancellation ratio may be calculated by a calculation formula of $P_{CRS\_N}$ divided by $P_{CRS\_N'}$ or by a calculation formula of $P_{CRS\_N}-P_{CRS\_N'}$.

In step S3210, the UE 100-1 stores the interference cancellation ratio.

Procedures of steps S3211 to S3215 are in much the same way as those in the operation pattern 1 according to the present embodiment.

Third Embodiment

Hereinafter, a third embodiment will be described while focusing on differences from the aforementioned first embodiment and second embodiment.

In the above-described second embodiment, by transmitting, from the eNB 200-1, a replica signal for canceling the reference signal (CSI-RS) transmitted by the eNB 200-2, received power after the interference cancellation can be measured in the UE 100-1. However, other UE 100 may be adversely affected by transmitting such a replica signal from the eNB 200-1.

Therefore, the present embodiment enables the evaluation of the effect of interference cancellation by the following method.

Firstly, the eNB 200-1 transmits a new reference signal (evaluation reference signal) to which the same transmission power and precoder as that of the interference replica signal is applied using the same radio resource (resource element) as that of the eNB 200-2. It is noted that the evaluation reference signal is a signal which has a signal sequence different from the reference signal (CSI-RS) transmitted by the eNB 200-2, and to which the same transmission process as that of the interference replica signal is applied.

Secondly, the UE 100-1 receives the evaluation reference signal from the eNB 200-1 to perform channel estimation (first channel estimation) using the evaluation reference signal.

Thirdly, the UE 100-1 receives the reference signal (CSI-RS) from the eNB 200-2 to perform channel estimation (second channel estimation) using the reference signal (CSI-RS).

Fourthly, the UE 100-1 estimates received power of a synthesized signal of the reference signal (CSI-RS) and the evaluation reference signal when it is assumed that the evaluation reference signal is the same signal sequence as that of the reference signal (CSI-RS) from the eNB 200-2 on the basis of a result of the first channel estimation and a result of the second channel estimation. That is, the received power after the interference cancellation is estimated.

Fifthly, the UE 100-1 transmits (reports) the estimated received power to the eNB 200-1. Furthermore, similarly to the second embodiment, the UE 100-1 may transmit (report) at least one of SIR and an interference cancellation ratio to the eNB 200-1 on the basis of the estimated received power.

Other Embodiments

Thus, the present disclosure has been described with the embodiments. However, it should not be understood that those descriptions and drawings constituting a part of this disclosure limit the present disclosure. From this disclosure, a variety of alternate embodiments, examples, and applicable techniques will become apparent to one skilled in the art.

In each of the aforementioned embodiments, the eNB 200-1 generates the OFDM signal from the desired wave signal superposed with the interference replica signal, and transmits the generating OFDM signal; however, this is not limiting. For example, the eNB 200-1 may generate a signal such as a CDMA signal, an IDMA signal, a FDMA signal and a TDMA signal, and transmit the generating signal.

In each of the aforementioned embodiments, the serving cell and the neighbor cell are managed by different eNBs (the eNB 200-1 and the eNB 200-2). However, the serving cell and the neighbor cell may be managed by the same eNB (the eNB 200-1). Further, the eNB 200-1 may apply the present disclosure in a case where the UE 200-1 and the UE 200-2 are located in the same serving cell. Thus, the eNB 200-1 may manage each of communication with the UE 100-1 and communication with the UE 200-2. For example, the eNB 200-1 may evaluate the effect of interference cancellation by applying the present disclosure in a case the eNB 200-1 performs MU (Multi User)—MIMO (Multiple Input Multiple Output) in which a plurality of UEs 100 (the UE 100-1 and the UE 100-2) are spatially multiplexed by a downlink multi-antenna transmission.

In the aforementioned second embodiment, reception phase and amplitude of at least one of the interference wave signal and the superposed signal received in the UE 100-1 shift on the basis of changing channel state. As a result, even though the interference replica signal is ideally generated, the received power of the interference replica signal in the UE 100-1 does not become zero. In this case, the UE 100-1 may enhance followability to channel fluctuation by shortening report cycle of CSI feedback on the basis of an instruction from the eNB 200 or determination of the UE 100-1. Alternatively, the eNB 200-1 may determine that the UE 100-1 is moving at high speed, and remove the UE 100-1 from the target of coordinated transmission.

Each of the aforementioned embodiments has described an example in which the present disclosure is applied to the LTE system. However, the present disclosure may also be applied to systems, other than the LTE system, as well as the LTE system.

In addition, the entire content of U.S. Provisional Application No. 61/740,989 (filed on Dec. 21, 2012), U.S. Provisional Application No. 61/745,016 (filed on Dec. 21, 2012), U.S. Provisional Application No. 61/745,043 (filed on Dec. 21, 2012), and U.S. Provisional Application No. 61/748,287 (filed on Jan. 2, 2013) is incorporated in the present specification by reference.

INDUSTRIAL APPLICABILITY

As described above, the mobile communication system, the communication control method, the base station, the user terminal and the processor according to the present disclosure are able to evaluate an effect of interference cancellation in a coordinated interference cancellation scheme, and thus are useful for a mobile communication field.

The invention claimed is:

1. A mobile communication system comprising:
a first user terminal configured to receive a desired wave signal being a signal from a serving cell to the first user terminal and an interference wave signal being a signal from a neighboring cell of the serving cell to a second user terminal; and
a base station configured to manage the serving cell, wherein
the base station includes a base station-side controller configured to:
  generate an interference replica signal corresponding to the interference wave signal;
  superpose the interference replica signal on the desired wave signal;
  transmit the desired wave signal superposed with the interference replica signal to the first user terminal so as to cancel the interference wave signal received by the first user terminal, wherein
  the interference wave signal includes a first reference signal,
  the interference replica signal includes a reference signal replica for canceling the first reference signal; and
the first user terminal includes a terminal-side control unit controller configured to:
  measure first received power that is received power of the first reference signal under a situation where the interference replica signal is superposed on the desired wave signal.

2. The mobile communication system according to claim 1, wherein
the second user terminal is connected to the neighbor cell adjacent to the serving cell, and
the interference wave signal is a signal from the neighbor cell.

3. The mobile communication system according to claim 1, wherein
the base station manages the serving cell to which the first user terminal is connected and the neighbor cell, and
the base station-side unit controller transmits the interference wave signal to the second user terminal.

4. The mobile communication system according to claim 1, wherein
the second user terminal is located in the serving cell to which the first user terminal is connected, and
the base station-side controller transmits the interference wave signal to the second user terminal.

5. The mobile communication system according to claim 1, wherein
the base station manages each of communication with the first user terminal and communication with the second user terminal, and
the base station-side controller transmits the interference wave signal to the other second user terminal.

6. The mobile communication system according to claim 1, wherein
the terminal-side controller notifies the base station of the first received power.

7. The mobile communication system according to claim 1, wherein
the first user terminal receives a second reference signal from the serving cell in addition to the desired wave signal,
the terminal-side controller further measures second received power that is received power of the second reference signal, and
the terminal-side controller notifies the base station of a desired wave-to-interference wave ratio that indicates a ratio of the first received power and the second received power.

8. The mobile communication system according to claim 1, wherein
the terminal-side controller further measures third received power that is received power of the first reference signal under a situation where the interference replica signal is not superposed on the desired wave signal, and
the terminal-side controller notifies the base station of an interference cancellation ratio that indicates a ratio of the first received power and the third received power.

9. The mobile communication system according to claim 1, wherein
the first user terminal receives a third reference signal from the neighbor cell in addition to the interference wave signal, and information indicating a transmission power ratio of transmission power of the first reference signal and transmission power of the third reference signal,
the terminal-side controller measures fourth received power that is received power of the third reference signal, and
the terminal-side controller notifies the base station of an interference cancellation ratio that indicates a ratio of the first received power and the fourth received power on the basis of the first received power, the fourth received power, and the transmission power ratio.

10. The mobile communication system according to claim 1, wherein
the first user terminal receives an evaluation reference signal transmitted from the base station, wherein the evaluation signal is a signal having a signal sequence different from that of the first reference signal, and is a signal to which the same transmission process as that of the interference replica signal is applied,
the terminal-side unit controller performs first channel estimation using the evaluation reference signal and second channel estimation using the first reference signal,
the terminal-side controller estimates received power of a synthesized signal of the first reference signal and the evaluation reference signal on the basis of a result of the first channel estimation and a result of the second channel estimation when it is assumed that the evaluation reference signal is the same signal sequence as that of the first reference signal.

11. The mobile communication system according to claim 1, wherein the base station-side controller receives information on a signal waveform of the interference wave signal from a base station managing the neighboring cell; and the base station-side controller generates, on the basis of the received information, the interference replica signal corresponding to the interference wave signal.

12. A communication control method, which controls a first user terminal configured to receive a desired wave signal being a signal from a serving cell to the first user terminal and an interference wave signal being a signal from a neighboring cell of the serving cell to a second user terminal and a base station configured to manage the serving cell, the communication control method comprising the steps of:

generating, by the base station, an interference replica signal corresponding to the interference wave signal;

superposing, by the base station, the interference replica signal on the desired wave signal;

transmitting, by the base station, the desired wave signal superposed with the interference replica signal to the first user terminal so as to cancel the interference wave signal received by the first user terminal, wherein the interference wave signal includes a first reference signal, the interference replica signal includes a reference signal replica for canceling the first reference signal; and the communication control method further comprises:

measuring, by the first user terminal, first received power that is received power of the first reference signal under a situation where the interference replica signal is superposed on the desired wave signal.

13. A base station comprising:

a controller configured to:

generate an interference replica signal corresponding to an interference wave signal being a signal from a neighboring cell of a serving cell of a first user terminal to a second user terminal; and superpose the interference replica signal on a desired wave signal being a signal from the serving cell to the first user terminal;

the base station further comprises a transmitter configured to transmit the desired wave signal superposed with the interference replica signal to the first user terminal so as to cancel the interference wave signal received by the first user terminal, wherein the interference wave signal includes a first reference signal, and the interference replica signal includes a reference signal replica for canceling the first reference signal.

14. A first user terminal comprising:

a receiver configured to receive a desired wave signal being a signal from a serving cell to the first user terminal and an interference wave signal being a signal from a neighboring cell of the serving cell to a second user terminal, wherein the interference wave signal includes a first reference signal; and a controller configured to measure first received power that is received power of the first reference signal under a situation where an interference replica signal corresponding to the interference wave signal is superposed on the desired wave signal, wherein the interference replica signal is generated by a base station that manages the serving cell and superposed on the desired wave signal so as to cancel the interference wave signal received by the first user terminal, and the interference replica signal includes a reference signal replica for canceling the first reference signal.

15. An apparatus for controlling a base station comprising:

a processor and a memory coupled to the processor, the processor configured to perform processes of:

generating an interference replica signal corresponding to an interference wave signal being a signal from a neighboring cell of a serving cell of a first user terminal to a second user terminal;

superposing the interference replica signal on a desired wave signal being a signal from the serving cell to the first user terminal; and transmitting the desired wave signal superposed with the interference replica signal to the first user terminal so as to cancel the interference wave signal received by the first user terminal, wherein the interference wave signal includes a first reference signal, the interference replica signal includes a reference signal replica for canceling the first reference signal.

16. An apparatus for controlling a first user terminal comprising:

a processor and a memory coupled to the processor, the processor configured to perform processes of:

receiving a desired wave signal being a signal from a serving cell to the first user terminal and an interference wave signal being a signal from a neighboring cell of the serving cell to a second user terminal, wherein the interference wave signal includes a first reference signal; and measuring first received power that is received power of the first reference signal under a situation where an interference replica signal corresponding to the interference wave signal is superposed on the desired wave signal, wherein the interference replica signal is generated by a base station that manages the serving cell and superposed on the desired wave signal so as to cancel the interference wave signal received by the first user terminal, and the interference replica signal includes a reference signal replica for canceling the first reference signal.

* * * * *